United States Patent [19]

Horike

[11] 4,286,273

[45] Aug. 25, 1981

[54] DEFLECTION COMPENSATED INK EJECTED PRINTING APPARATUS

[75] Inventor: Masanori Horike, Tokyo, Japan

[73] Assignee: Ricoh Company, Ltd., Tokyo, Japan

[21] Appl. No.: 87,915

[22] Filed: Oct. 24, 1979

[30] Foreign Application Priority Data

Nov. 2, 1978 [JP] Japan .............................. 53-135427

[51] Int. Cl.[3] ........................................ G01D 15/18

[52] U.S. Cl. ................................ 346/75; 346/140 R

[58] Field of Search ............................ 346/75, 140 IJ

[56] References Cited

U.S. PATENT DOCUMENTS

| | | | |
|---|---|---|---|
| 3,898,673 | 8/1975 | Haskell | 346/75 X |
| 3,999,188 | 12/1976 | Yamada | 346/75 |
| 4,067,019 | 1/1978 | Fleischer et al. | 346/75 |
| 4,129,875 | 12/1978 | Ito et al. | 346/75 |

*Primary Examiner*—George H. Miller, Jr.

*Attorney, Agent, or Firm*—David G. Alexander

[57] ABSTRACT

Prior to printing, ink drops are ejected from an ink ejection head or nozzle (28) and an amount of deflection is sweepingly varied until the ink drops hit a target (57), thereby providing a reference which compensates for variations in an amount of charge of the ink drops, a mass of the ink drops, a deflection voltage and an ink drop velocity.

18 Claims, 16 Drawing Figures

ACCUMU-LATOR
P
CE
SE
AMP
AMP
CHARGE SENSOR
DEFLECTION DRIVE UNIT
DRIVE SIGNAL GENERATOR
CHARGE CONTROL UNIT
PHASE SHIFT UNIT
FREQ DIV
REF GEN
SWITCH UNIT
CLOCK PULSE GENERATOR
SEARCH SIGNAL GENERATOR
CHARGE SIGNAL GENERATOR
21
23
24
26
27
28
29
31
32
33
34
36
37
38
42
43
44
46
47
48
49
51
52
53
54
56
57
58
59
61
62
63
77
84

49
58
57
56
61
44
48
28
33
34
CE
131
59
62
23
46
63
24
ACCUMU-LATOR
26
27
P
23
32
43
AMP
AMP
47
DEFLECTION DRIVE UNIT
31
42
DRIVE SIGNAL GENERATOR
CHARGE CONTROL UNIT
38
PHASE SHIFT UNIT
102
37
SWITCH UNIT
29
54
CLOCK PULSE GENERATOR
SEARCH SIGNAL GENERATOR
CHARGE SIGNAL GENERATOR
36
IMAGE SIGNAL, SEARCH SIGNAL

ACCUMU-LATOR
P
CE
SE
AMP
AMP
CHARGE SENSOR
DEFLECTION DRIVE UNIT
DRIVE SIGNAL GENERATOR
CHARGE CONTROL UNIT
PUMP DRIVE UNIT
PHASE SHIFT UNIT
SWITCH UNIT
CLOCK PULSE GENERATOR
SEARCH SIGNAL GENERATOR
CHARGE SIGNAL GENERATOR
PHASE SEARCH COMMAND PULSE
IMAGE SIGNAL, SEARCH SIGNAL

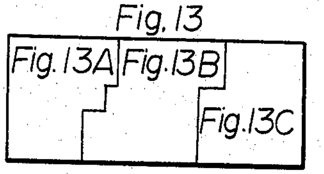
Fig. 13A
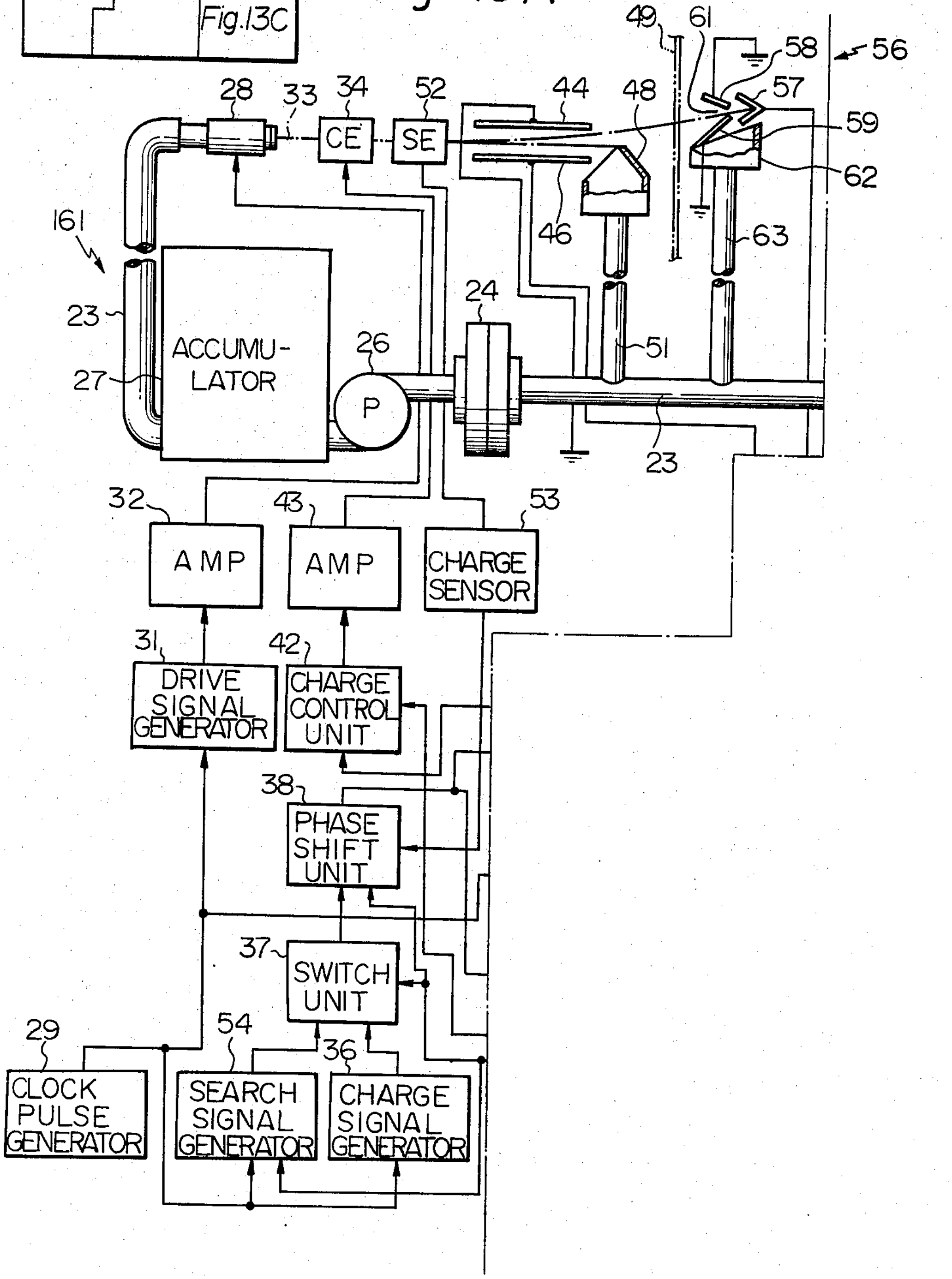

181
28
33
34
CE
44
48
49
61
58
57
59
62
46
51
63
23
ACCUMU-
LATOR
27
26
P
24
23
32
AMP
AMP
43
31
DRIVE
SIGNAL
GENERATOR
42
CHARGE
CONTROL
UNIT
120
38
PHASE
SHIFT
UNIT
84
FREQ
DIV
83
76
COUNTER
CK
CL
86
D/A
37
SWITCH
UNIT
102
Q
S
R
73
74
29
CLOCK
PULSE
GENERATOR
54
SEARCH
SIGNAL
GENERATOR
CHARGE
SIGNAL
GENERATOR
36
SEARCH
COMMAND
PULSE
DEFLECTION SEACHING
IMAGE SIGNAL,
SEACH SIGNAL

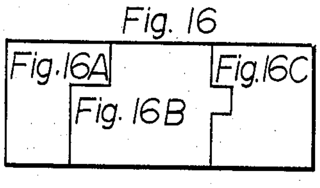
Fig. 16A
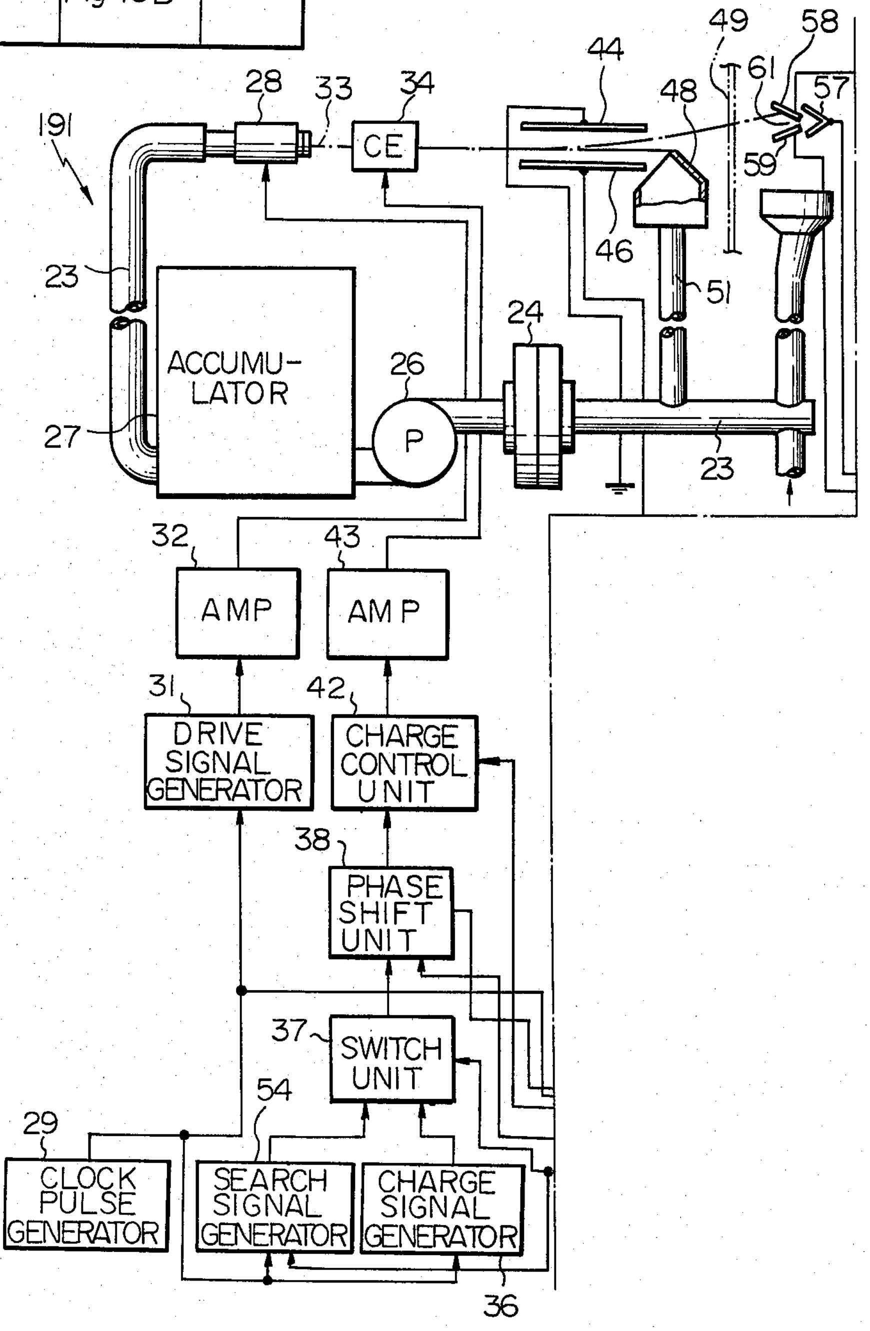

DEFLECTION COMPENSATED INK EJECTED PRINTING APPARATUS

BACKGROUND OF THE INVENTION

The present invention relates to an ink ejection printing apparatus for an ink jet printer. Such a printer comprises an ink ejection nozzle in which is provided an ultrasonic vibrator. Application of ejection or drive pulses to the vibrator causes an ink jet ejected from the nozzle to be atomized into drops or droplets. The ink drops are electrically charged by an electrode. A deflection voltage is applied to deflection electrodes which deflect the charged droplets onto paper for printing. Where it is desired not to print a dot, no charging voltage is applied and the ink droplets are caught by a gutter. A prior art example of such an ink ejection printing apparatus is disclosed in IBM Technical Disclosure Bulletin Vol. 16, No. 12, May 1974, Japanese patent publication No. 47-43450 and Japanese patent application disclosure No. 50-46450.

One problem in a system of the present type is to synchronize application of the charging pulses applied to the charging electrode with the position of the ink drops. The charge will be optimum only if the charging pulses are applied to the charging electrode at the time the ink drops are adjacent to the electrode. Synchronism can be achieved by providing a sensing electrode downstream of the charging electrode for sensing the amount of charge on the ink drops and varying the phase between ink ejection pulses and charging pulses until a desired charge value is achieved. This is known as a phase sweep operation and is disclosed in Japanese patent publication No. 47-43450 and Japanese patent application disclosure No. 50-60131.

Another problem is in adjusting the amount of deflection of the ink jet to an optimum value. If the deflection is too great or too small, the printed image will be distorted, particularly enlarged or reduced in relation to the main scan feed pitch. This can, in extreme cases, produce an unintelligible image. The problem is compounded by the fact that the deflection is a function of a number of variables, including the charge on the ink drops, the mass of the ink drops, the deflection voltage, the spacing between the deflection electrodes and the ejection velocity of the drops. Mere adjustment of the ink drop charge using the phase sweep operation cannot result in a predetermined amount of deflection since the deflection also depends on the other variables.

SUMMARY OF THE INVENTION

An ink ejection apparatus embodying the present invention includes ink ejection means for charging and ejecting ink and deflecting the ink from an ejection axis in a direction in response to a deflection signal, and is characterized by comprising target means spaced from the ejection axis in said direction, hit sensor means for sensing impingement of the ink on the target means and producing a hit signal in response thereto, and deflection sweep means for controlling the ink ejection means to sweepingly vary deflection of the ink until the hit sensor means produces the hit signal.

Prior to printing, ink is ejected from an ink ejection head and an amount of deflection is sweepingly varied until the ink hits a target, thereby providing a reference which compensates for variations in an amount of charge of the ink, a mass of the ink drops, a deflection voltage and an ink drop velocity.

It is an object of the present invention to provide an ink ejection printing apparatus comprising means for automatically adjusting ink jet deflection to an optimum value.

It is another object of the present invention to provide an ink ejection printing apparatus which is capable of printing in a manner which is free of distortion.

It is another object of the present invention to provide an ink ejection printing apparatus comprising novel and unique means for performing both charging phase sweep and deflection sweep in an automatic and combined manner.

It is another object of the present invention to provide an ink ejection printing apparatus which is reliable in operation, provides high quality printing and is economical to manufacture on a commercial production basis.

It is another object of the present invention to provide a generally improved ink ejection printing apparatus.

Other objects, together with the foregoing, are attained in the embodiments described in the following description and illustrated in the accompanying drawing.

DESCRIPTION OF THE PREFERRED EMBODIMENTS

While the ink ejection printing apparatus of the present invention is susceptible of numerous physical embodiments, depending upon the environment and requirements of use, substantial numbers of the herein shown and described embodiments have been made, tested and used, and all have performed in an eminently satisfactory manner.

Figures 1, 1A, 1B:
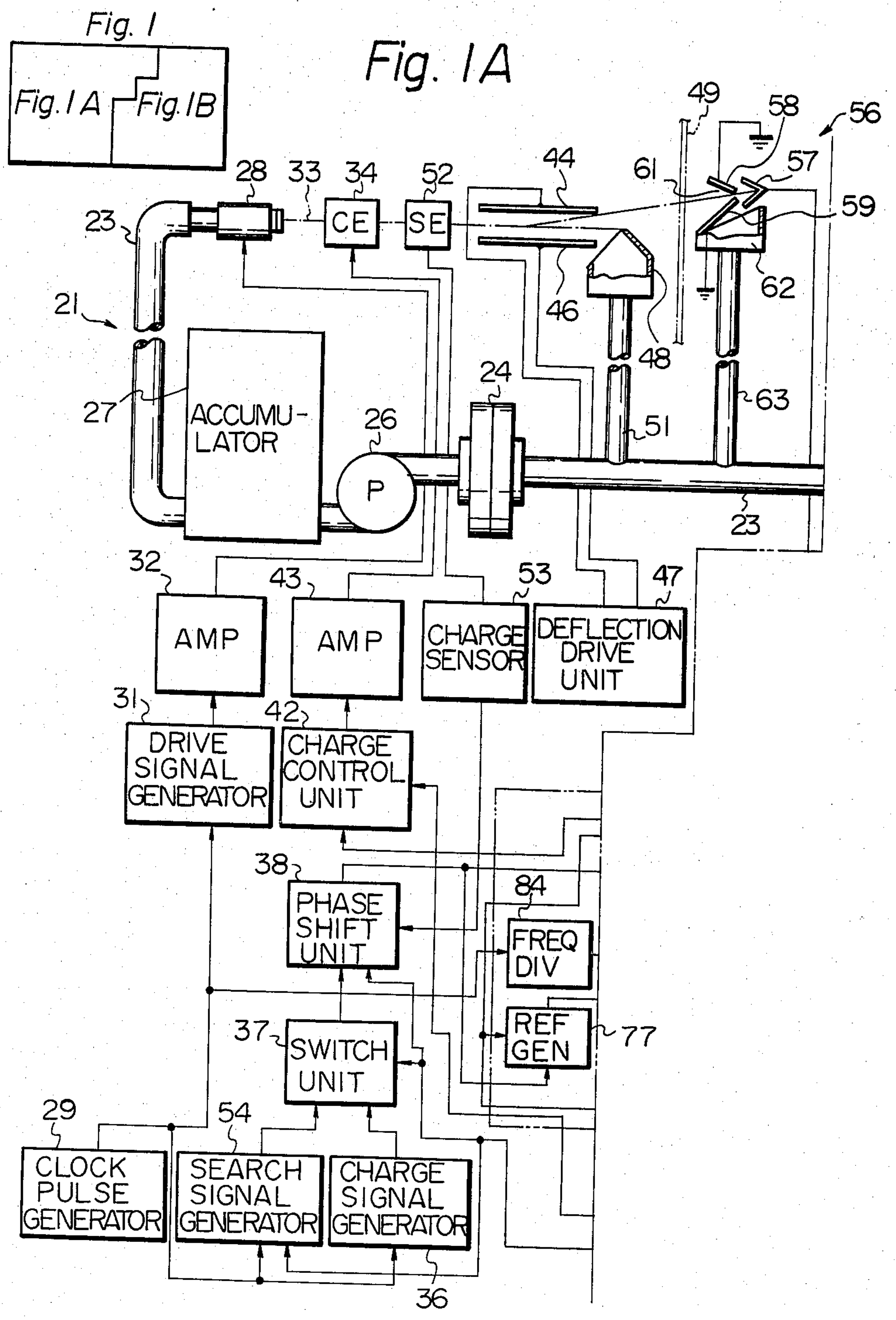
FIG. 1 is a schematic diagram, partially in block form, of an ink ejection printing apparatus embodying the present invention.
Figure 1B:
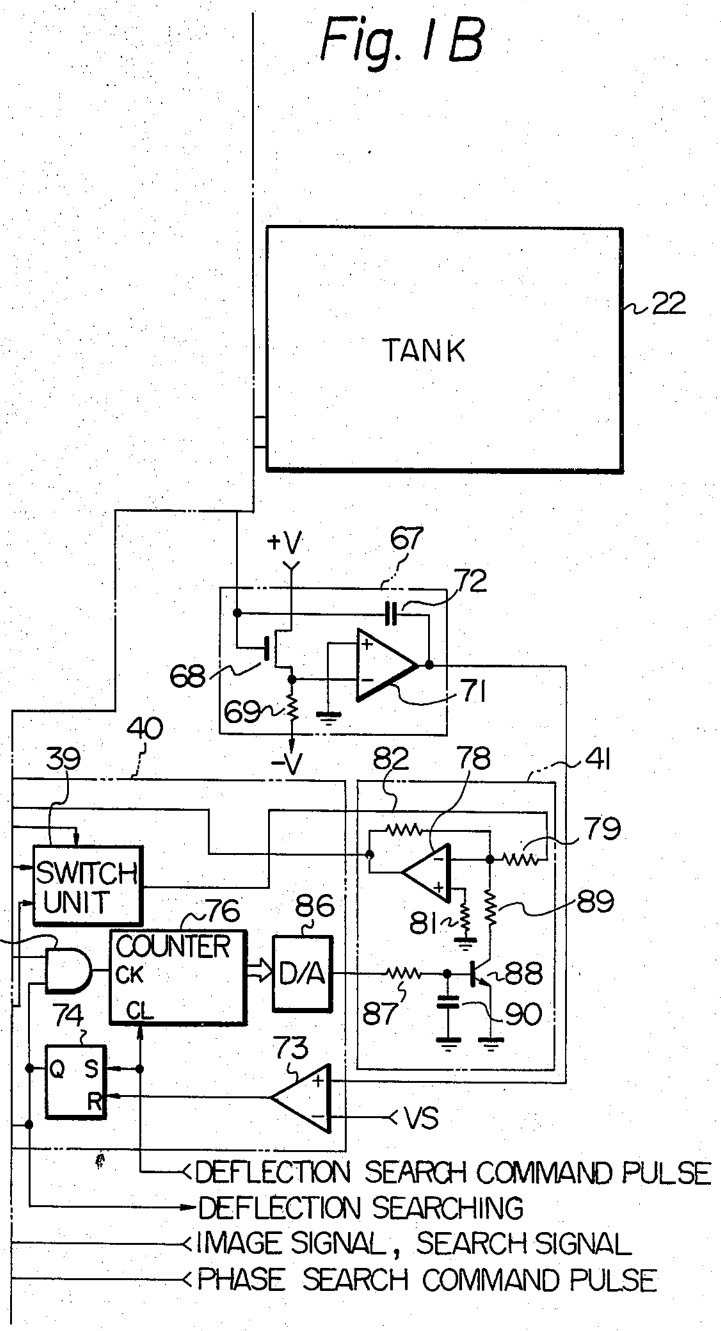

Referring now to FIG. 1 of the drawing, an ink ejection printing apparatus embodying the present invention is generally designated by the reference numeral 21 and comprises a reservoir or tank 22 for containing ink. The tank 22 communicates through a conduit 23 and filter 24 with a pump 26 which pumps the ink to an ink ejection nozzle 28. An accumulator 27 is disposed in the conduit 23 to smooth out pressure fluctuations from the pump 26. A clock pulse generator 29 generates clock pulses which are applied to a drive signal generator 31. The generator 31 produces, in response to the clock pulses, drive or ink ejection pulses which are applied through an amplifier 32 to an ultrasonic vibrator (not shown) in the nozzle (28). The vibrator typically comprises a piezoelectric element which flexes or vibrates in response to applied voltage. The ejection pulses cause the vibrator to vibrate, for example, 612 times per second and create a pressure wave in the nozzle (28) which causes a jet of ink ejected along an ejection axis 33 to be atomized into drops.

The clock pulses are applied to a charge signal generator 36 which generates charge pulses in response thereto. The charge pulses vary in amplitude in a staircase pattern and are applied through a switch unit 37, phase shift unit 38, switch unit 39 of a deflection sweep unit 40, charge level set unit 41, charge control or gate unit 42 and amplifier 43 to the charging electrode 34. The charge pulses are synchronized to be timed in phase relative to the ejection pulses so that the charge pulses will be applied to the charging electrode 34 as the ink drops pass thereby. The electrode 34 induces an electrostatic charge on the ink drops.

The charged ink drops pass between deflection electrodes 44 and 46. A deflection drive unit 47 applies voltages of opposite polarities to the electrodes 44 and 46 such that the voltage applied to the electrode 44 has the opposite polarity of the charge applied to the ink drops and the voltage applied to the electrode 46 has the same polarity as the charge applied to the ink drops. This causes the ink drops to be deflected in the upward direction as viewed in FIG. 1 above a gutter 48 onto a sheet of printing paper 49.

Where it is desired to print a dot on the paper 49, an image signal is applied to the charge control unit 42 which gates the charge pulses to the charging electrode 34. This causes the ink droplets of the jet to be charged and deflected as described upwardly onto the paper 49. Where it is desired not to print a dot, the image signal is not applied to the charge control unit 42 with the result that the ink drops will not be charged. Thus, the deflection electrodes 44 and 46 will have no effect and the ink drops will not be deflected from the axis 33 but will be caught in the gutter 48 and returned through a pipe 51 to the conduit 23. The same effect may be obtained by continuously applying the charging pulses to the electrode 34 and applying the deflection voltages to the electrodes 44 and 46 only when it is desired to print a dot.

Printing is effected by moving the paper 49 perpendicular to the plane of the drawing and applying the image signals to the charge control unit 42. The image signals are generated by a computer of the like and correspond to the characters, pattern or the like which is to be printed. After a scan line is printed in this manner, the paper 49 is moved upwardly by one increment and then moved perpendicular to the plane of the drawing again to print the next scan line.

In order to achieve undistorted printing, the ink drops of the jet must be deflected always by the same predetermined distance which is a function of the amount of incremental movement of the paper 49 in the main scan, or upward direction. Generally, the amount of deflection may be determined by the following equation $$x_d = K \cdot \frac{Q_j \cdot V_{dp}}{m_j \cdot S_{dp} \cdot v_j^2} \quad (1)$$

where $x_d$ is the distance the ink drops are deflected, $Q_j$ is the charge on each ink drop, $V_{dp}$ is the potential across the electrodes 44 and 36, $S_{dp}$ is the spacing between the electrodes 44 and 46 and $v_j$ is the ejection velocity of the ink drops.

The factors K, $m_j$ and $S_{dp}$ may be maintained constant rather easily. However, the deflection still is a function of the three factors $Q_j$, $V_{dp}$ and $v_j^2$. Another variable is how long the ink has been stored in the tank 22.

In order for the apparatus 21 to operate properly, the charging pulses must be applied to the electrode 34 as the ink drops pass thereby. This timing has a major effect on the charge $Q_j$. The phase or timing may be synchronized to an optimum value by means of a phase searching operation which will now be described.

The apparatus 21 further comprises a charge sensor electrode 52 which is disposed between the charging electrode 34 and the deflection electrodes 44 and 46. A charge is induced on the electrode 52 which corresponds to the charge on the ink drops. The electrode 52 is connected to an input of a charge sensor 53 which produces a phase set output when the sensed charge has a predetermined value or exceeds a predetermined value. The phase set signal is applied to the phase shift unit 38.

Prior to an actual printing operation, a phase search command pulse is applied to a search signal generator 54, the switch unit 37 and the phase shift unit 38. A search signal is applied to the charge control unit 42 which has the same effect as the image signal in that it causes the charging pulses to be gated through the charge control unit 42 to the electrode 34. The phase search command pulse causes the switch unit 37 to connect the search signal generator 54 rather than the charge signal generator 36 to the phase shift unit 38.

The search signal generator 54 produces phase search pulses which have the same phase as the charging pulses from the unit 36 but which have a constant amplitude which is equal to the maximum amplitude of the charging pulses. The phase search pulses are applied through the phase shift unit 38, switch unit 39, level control unit 41, charge control unit 42 and amplifier 43 to the electrode 34.

The phase shift unit 38 functions to sweepingly vary the phase of the phase search pulses from in phase with the ejection pulses, through 180° out of phase with the ejection pulses and back to in phase with the ejection pulses. The voltage induced on the electrode 52 will vary from a low value to a maximum value at which point the phase between the phase search pulses and the ejection pulses is such that a maximum amount of charge is induced on the ink drops. The charge sensor 53 produces the phase set signal when the maximum charge is sensed or when the sensed charge has a predetermined value. The phase set signal is applied to the phase shift unit 38 which stops the phase sweep or search operation in response thereto. The phase shift value in the unit 38 is set or locked at the value at the time the phase set signal was received.

After sufficient time has elapsed for the phase search operation to be completed, the phase search command pulse is terminated causing the switch unit 37 to select the output of the charge signal generator 36 for normal operation. The search signal is also terminated allowing the charge control unit 42 to respond to the image signals.

Whereas the phase search operation functions to set the optimum phase relationship between the ejection pulses and the charging pulses, the amount of deflection of the ink drops depends on other factors as discussed above. For this reason, setting the correct phase will not necessarily result in the proper amount of deflection.

Figure 2:
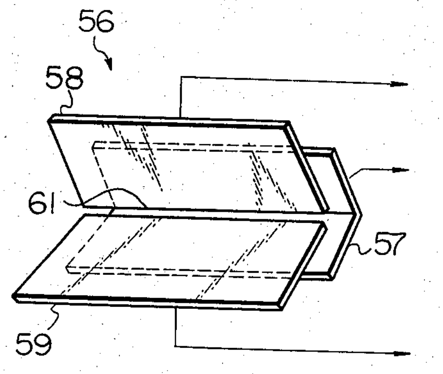
FIG. 2 is a perspective view of a target means of the present apparatus.
Figure 3:
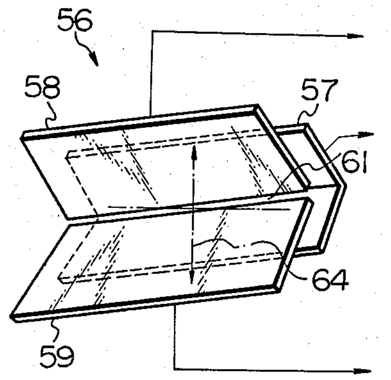
FIG. 3 is similar to FIG. 2 but shows a modified orientation of the target means.

For this reason, the apparatus 21 comprises a target unit 56 which is shown to enlarged scale in FIG. 2. The unit 56 comprises a V-shaped main target electrode 57 which is disposed behind a first auxiliary target electrode 58 and a second auxiliary target electrode 59. The electrodes 58 and 59 are arranged so as to define a slit therebetween which is indicated at 61. Ink ejected from the nozzle 28 and deflected by the electrodes 44 and 46 must pass through the slit 61 to impinge on the electrode 57. A gutter 62 is disposed below the target unit 56 to catch ink which impinges on the electrodes 57, 58 and 59 and runs down into the gutter 62. A pipe 63 conducts ink from the gutter 62 into the conduit 23. In the apparatus 21 the electrodes 58 and 59 are grounded and therefore do not affect the ink drops. If desired, the target unit 56 may be slightly inclined as illustrated in FIG. 3 relative to vertical and horizontal axis indicated at 64 so that the ink will run down the electrodes 57, 58 and 59 leftwardly away from the slit 61.

Figure 4:
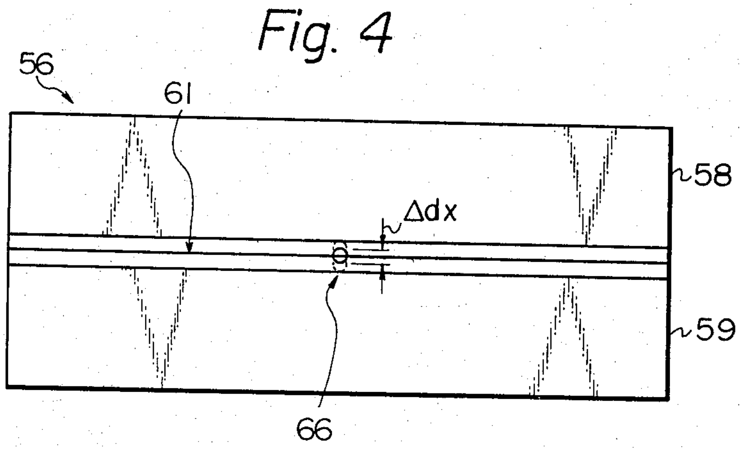
FIG. 4 is a diagram illustrating the operation of the target means.
Figure 5:
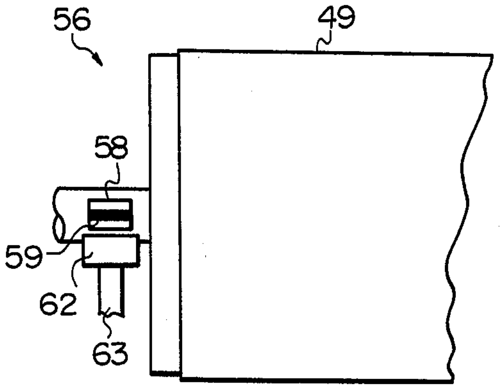
FIGS. 5 and 6 are diagrams illustrating alternative orientations of the target means.
Figure 6:
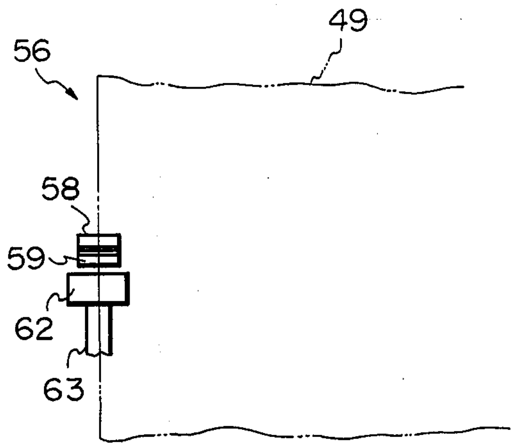

As shown in FIG. 4, the only ink drops which can pass through the slit 61 are those deviate from the center of the slit 61 by a maximum error range $\Delta d_x$ as indicated at 66. The target unit 56 may be disposed at a standby position to the left of the paper 49 as illustrated in FIG. 5 or at a print start position as illustrated in FIG. 6.

The electrode 57 is connected to an electrometer or hit sensor 67 which comprises a field effect transistor 68. The source and drain of the transistor 68 are connected between sources +V and −V in series with a resistor 69. The electrode 57 is connected to the gate of the transistor 68. The junction of the transistor 68 and resistor 69 is connected to the inverting input of an operational amplifier 71, the non-inverting input of which is grounded. The output of the operational amplifier 71 is connected through an integrating capacitor 72 to the gate of the transistor 68. When ink impinges on or hits the electrode 57, a potential is induced thereon which is applied to the electrometer 67. The output of the amplifier 71 is connected to the non-inverting input of a comparator 73, the inverting input of which is connected to a reference voltage source VS. When ink hits the target electrode 57, the induced potential is integrated by the electrometer 67 and applied to the comparator 73. When the integrated value exceeds the reference voltage VS, the comparator 73 produces a high output which resets a flip-flop 74. This constitutes a high signal which means that ink has passed through the slit 61 and hit the electrode 57.

If all conditions are perfect, the ink drops will always hit the target electrode 57. However, this is not usually the case. The present invention provides optimum deflection by performing a deflection search or sweep operation which will be described below.

After the phase search operation is completed, a deflection search command pulse is applied to the set input of the flip-flop 74 and also to a clear or reset input of a binary counter 76. The counter 76 is reset to zero and the high Q output of the flip-flop 74 is applied to a reference signal generator 77 and to the switch unit 39. The high Q output of the flip-flop 74 enables the generator 77 to produce a reference signal and causes the switch unit 39 to pass the reference signal, rather than the output of the phase shift unit 38, to the level set unit 41. Preferably, the electrode 57 is spaced from the axis 33 by a large amount which is greater than the deflection desired for regular printing. The reason for this is to maximize the accuracy of the deflection search. However, it is well within the scope of the present invention to space the target electrode 57 from the axis 33 by a distance desired for regular deflection or some other distance.

The reference signal generated by the unit 77 is selected to be larger in magnitude than the charging pulses generated by the unit 36. The reasons for this is to enable the ink jet to be deflected by the large distance to the target 57 which is greater than the deflection for normal printing. The reference signal is applied through the switch unit 39 to the level set unit 41 which comprises an operational amplifier 78. The output of the switch unit 39 is connected to the inverting input of the amplifier 78 through a resistor 79. The non-inverting input of the amplifier 78 is grounded through a resistor 81. A feedback resistor 82 is connected between the output and inverting input of the amplifier 78. The output of the amplifier 78 is also connected to the charge control unit 42.

The Q output of the flip-flop 74 is connected to an input of an AND gate 83, the output of which is connected to the clock or count input of the counter 76. The clock pulses from the generator 29 are applied through a frequency divider 84 to another input of the AND gate 83. Whereas the ejection pulses from the generator 31 cause the vibrator in the nozzle 28 to vibrate 612 times per second, the frequency divider 84 will have a frequency division ratio of 612 and will produce an output pulse each time 612 drops of ink are ejected.

The output of the counter 76 is connected through a digital-to-analog converter 86 and resistor 87 to the base of an NPN transistor 88. A capacitor 90 is connected between the base of the transistor 88 and ground. The emitter of the transistor 88 is grounded and the collector of the transistor 88 is connected through a resistor 89 to the inverting input of the amplifier 78.

In response to the deflection search command pulse, the flip-flop 74 is set and the counter 76 cleared. The reference signal from the generator 77 is applied to the inverting input of the amplifier 78 through the switch unit 39 and resistor 79.

The count in the counter 76 is initially zero, and the converter 86 produces a zero output. This turns off the transistor 88 which provides a substantially infinite impedance between the inverting input of amplifier 78 and ground. The input voltage applied to the amplifier 78 is therefore substantially equal to the reference voltage from the generator 77 and has a maximum value. Since the amplifier 78 is connected in an inverting configuration, the output will be a minimum value. This low voltage applied through the charge control unit 42 to the charging electrode 34 will cause a minimum charge to be applied to the ink drops. Thus, the first ink drops will fall short of the electrode 57 and hit the electrode 59.

The pulses from the frequency divider 84 gated through the AND gate 83 due to the high Q output of the flip-flop 74 progressively increment the counter 76. The converter 86 produces a progressively higher output which turns on the transistor 88 to a greater degree and reduces the impedance between the inverting input of the amplifier 78 and ground. The result is that a progressively lower voltage will be applied to the inverting input of the amplifier 78 which will produce a progressively higher output. This will cause a generator charge to be applied to the ink drops so that they will be deflected to a greater extent. When the ink drops are charged enough so as to be deflected through the slit 61 against the electrode 57, the comparator 73 will produce the high hit signal output which will reset the flip-flop 74. The AND gate 83 will be inhibited so that no more pulses can be gated therethrough to the counter 76. Thus, the count in the counter 76 will remain at the value at which the ink drops hit the target electrode 57. The low Q output of the flip-flop 74 will de-energize the generator 77 and cause the switch unit 39 to gate the output of the phase shift unit 38 to the level set unit 41 for normal printing operation. The converter 86 will produce an output voltage corresponding to the count in the counter 76 so that the output voltage of the level set unit 41 will be automatically adjusted to a predetermined value for undistorted printing.

The output of the converter 86 determines the gain of the level set unit 41. The magnitude of the charging pulses produced by the generator 36 is proportional to the magnitude of the reference signal produced by the generator 77. More specifically, the magnitude of the charging pulses is lower than the magnitude of the reference signal. Thus, the effect of the level set unit 41 on the charging pulses is the same as on the reference signal from the generator 77. Thus, the charging pulses will cause deflection of the ink jet to an extent proportional to the deflection caused by the reference signal. This causes the ink jet to be deflected to a predetermined optimum extent which corresponds to the ratio of the magnitude of the reference signal to the magnitude of the charging pulses.

FIGS. 7 to 16 illustrate additional embodiments of the present invention. Like elements will be designated by the same reference numerals used in FIG. 1. In order to avoid unnecessary repetition, only the portions of the embodiments of FIGS. 7 to 16 which differ from the embodiment of FIG. 1 will be described.

Figure 7:
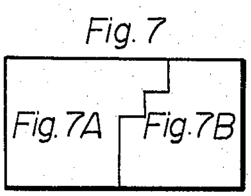
FIGS. 7 to 16 are similar to FIG. 1 but show alternative embodiments of the present ink ejection printing apparatus.
Figure 7A:
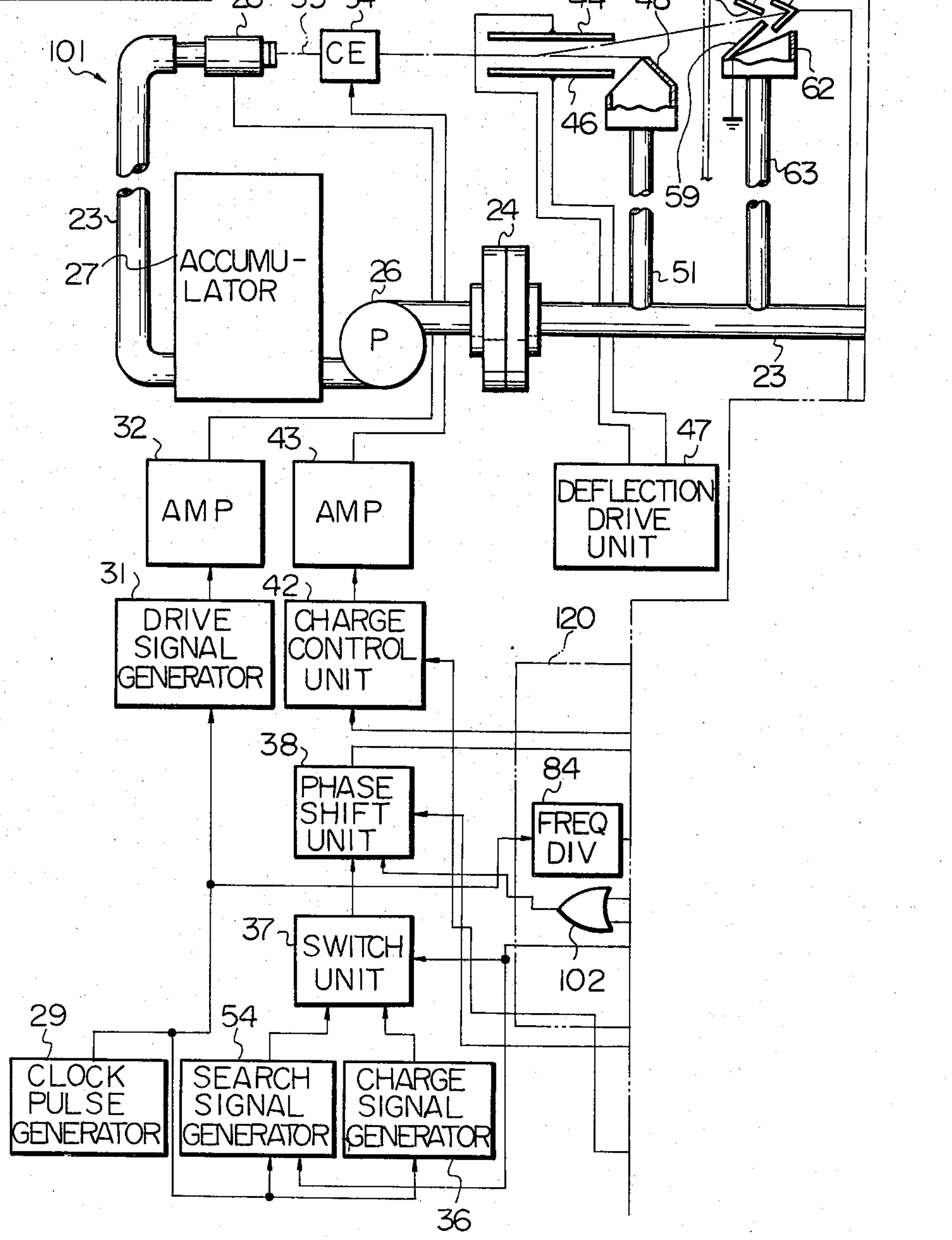
Figure 7B:
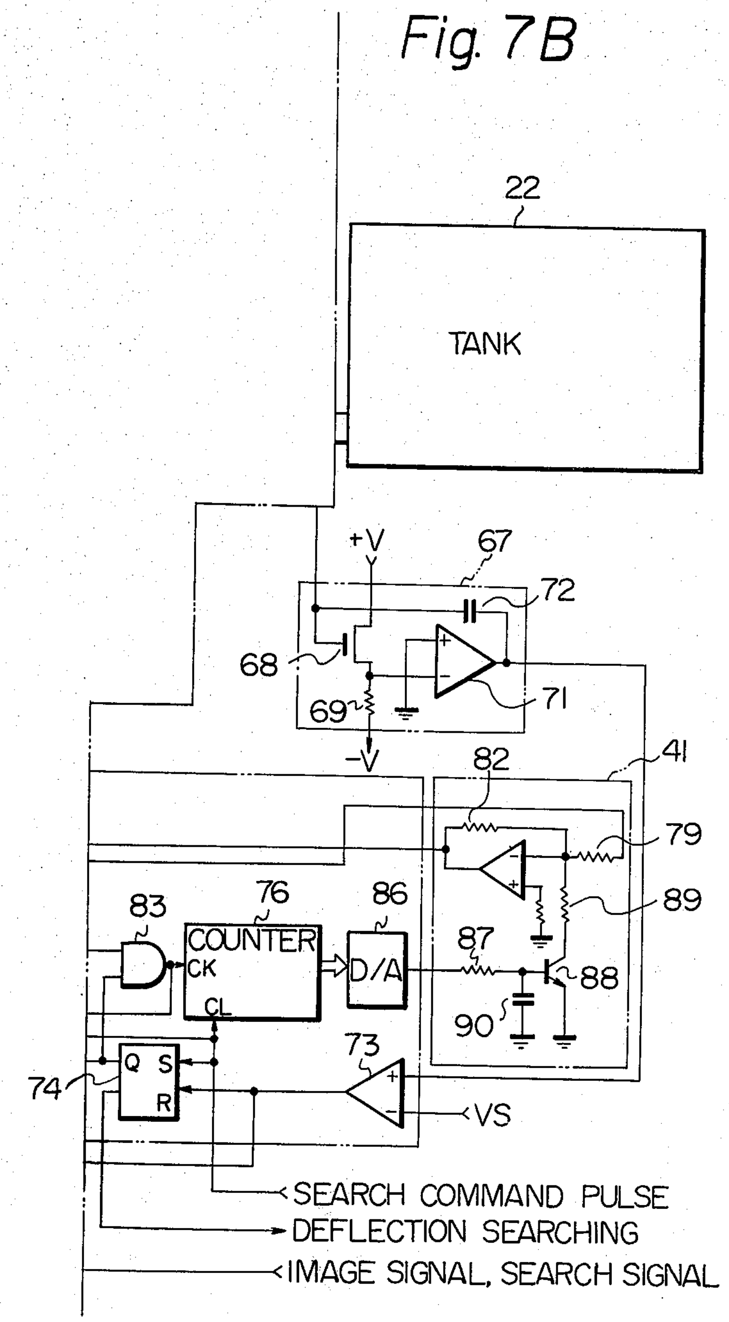

In an apparatus 101 shown in FIG. 7, the charge sensor electrode 52 and charge sensor 53 are omitted and the function of these elements is provided by the electrode 57, electrometer 67 and comparator 73. In this case, the hit signal output of the comparator 73 constitutes the phase set signal.

The apparatus 101 comprises an OR gate 102 having an input connected to the output of the AND gate 83 and an output connected to the input of the phase shift unit 38 which causes the phase search operation to begin. Another input of the OR gate 102 is connected to receive a search command pulse which causes the phase search operation and the deflection search operation to begin simultaneously.

The search command pulse is applied to the phase shift unit 38 which begins the phase shift operation in response thereto. The search command pulse is also applied to the counter 76. However, it will be noted that the reference signal generator 77 is also omitted in a deflection sweep unit 120 so that the phase search pulses from the generator 54 are applied through the switch unit 37, phase shift unit 38 and level set unit 41 to the charge control unit 42, amplifier 43 and electrode 34. The phase of the phase search pulses is sweepingly varied by the phase shift unit 38. The ink jet will initially be far below the target electrode 57 but will rise and fall as the phase reaches and passes the proper value. Although the jet is raised by the improved charging efficiency, it will still be below the electrode 57.

Each pulse gated through the AND gate 83 is further gated through the OR gate 102 to the phase shift unit 38, which causes the phase shift unit 38 to perform another phase shift operation. The same pulses gated through the AND gate 83 from the frequency divider 84 cause the counter 76 to be incremented and progressively increase the output of the converter 86. This increases the gain of the level set unit 41 and increases the magnitude of the phase search pulses which are fed therethrough to the electrode 34. This has the effect of increasing the deflection of the ink jet and raising the ink jet toward the slit 61 and electrode 57. Each time the magnitude of the pulses is increased by the converter 86, the phase search operation will raise the maximum level of the ink jet further toward the slit 61.

Finally, the combination of the output of the converter 86 and the phase shift value will enable the ink jet to pass through the slit 61 and hit the electrode 57. It will be understood that this occurs at the optimum phase value since the deflection is increased incrementally by the counter 76 and converter 86 and for each value of the output of the converter 86 the deflection will be maximum at the proper phase value. Thus, the apparatus 101 functions to automatically adjust the phase and deflection in a combined operation using unitary components. The hit signal output of the comparator 73 serves the dual function of stopping the deflection sweep or search operation by resetting the flip-flop 74 and stopping the phase search operation since it is applied to the phase set input of the phase shift unit 38.

Figure 8:
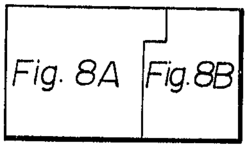
Figure 8A:
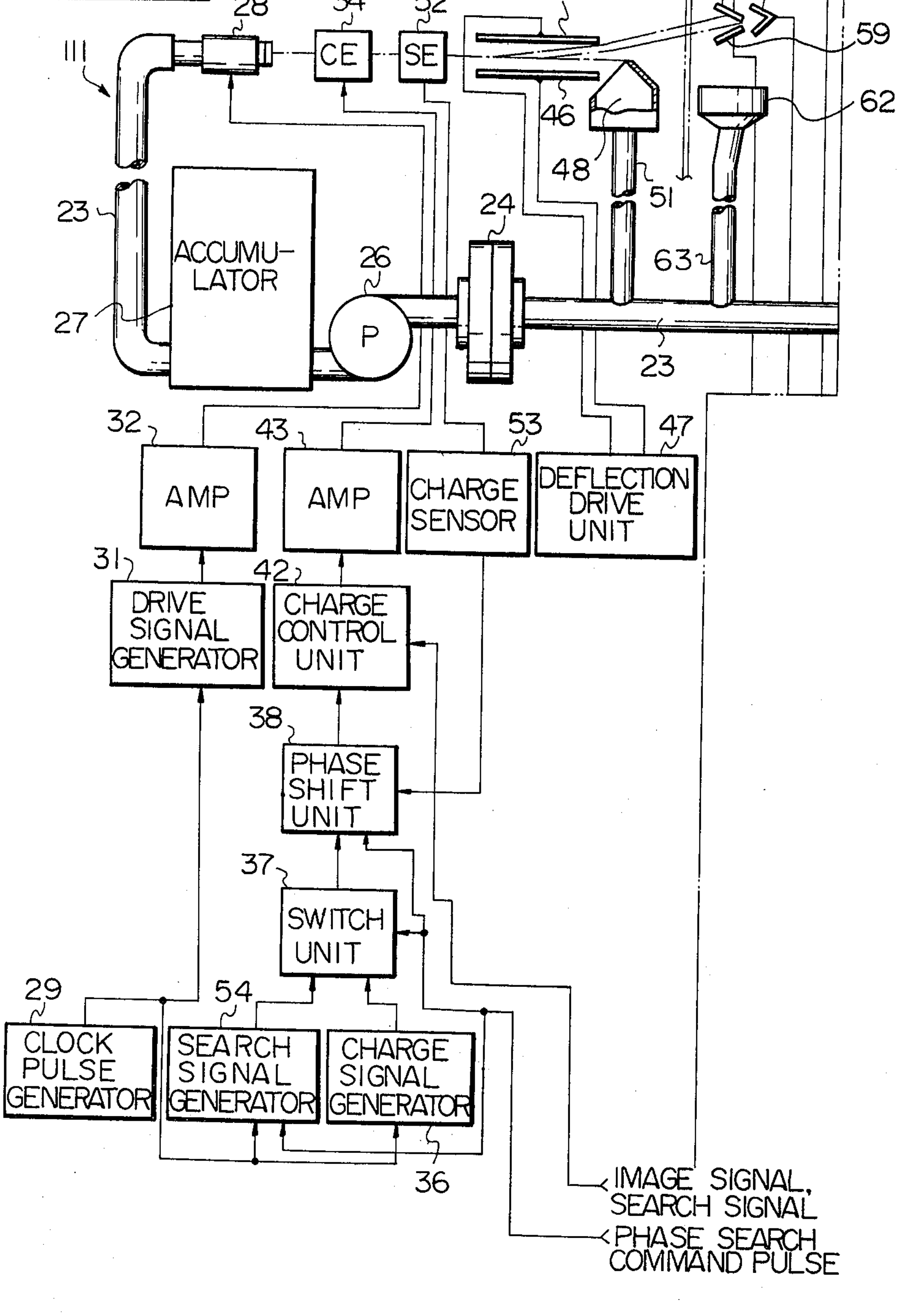
Figure 8B:
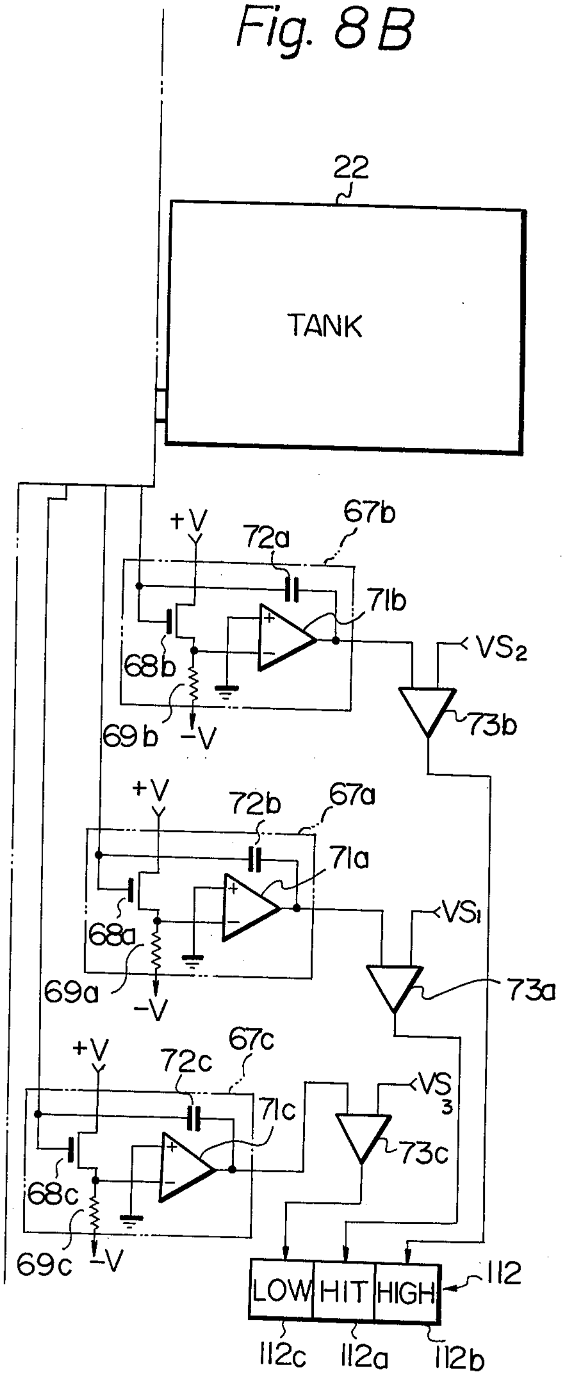

FIG. 8 illustrates another apparatus 111 embodying the present invention in which the phase search operation is performed in the same manner as in the apparatus 21 of FIG. 1, the electrometer 67 is redesignated as *67a* with the component parts designated by the same reference numerals as in the electrometer 67 but suffixed by the character a. The auxiliary target electrodes 58 and 59 are not grounded, but are connected to inputs of electrometers *67b* and *67c* respectively, with the component parts designated by the same reference numerals as in the electrometer 67 suffixed by the characters b and c respectively. The outputs of the electrometers *67a*, *67b* and *67c* are connected to indicators *112a*, *112b* and *112c* of an indicator unit 112 respectively.

When the ink jet hits the target electrode 57, the electrometer *67a* produces the main hit signal which energizes the indicator *112a*. Similarly, when the ink drops hit the electrodes 58 and 59, the electrometers *67b* and *67c* produce auxiliary hit signal outputs which energize the indicators *112b* and *112c* respectively. Naturally, the ink jet can only hit one of the electrodes 57, 58 and 59.

The indicator unit 112 indicates the position of the ink jet and allows manual variation of the magnitude of the charging pulses, the magnitude of the deflection voltage applied to the electrodes 44 and 46 by the unit 47 or the output pressure of the pump 26 since all of these parameters affect the deflection of the ink jet in accordance with equation (1). Alternatively, the outputs of the electrometers *67a*, *67b* and *67c* may be used for automatic adjustment of any of these variables as will be described with reference to FIGS. 9 to 16. In either case, the parameter is adjusted until the electrometer *67a* produces the main hit output indicating that the ink jet has passed through the slit 61 and hit the main target electrode 57.

Figure 9:
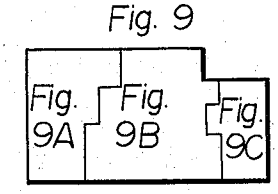
Figure 9A:
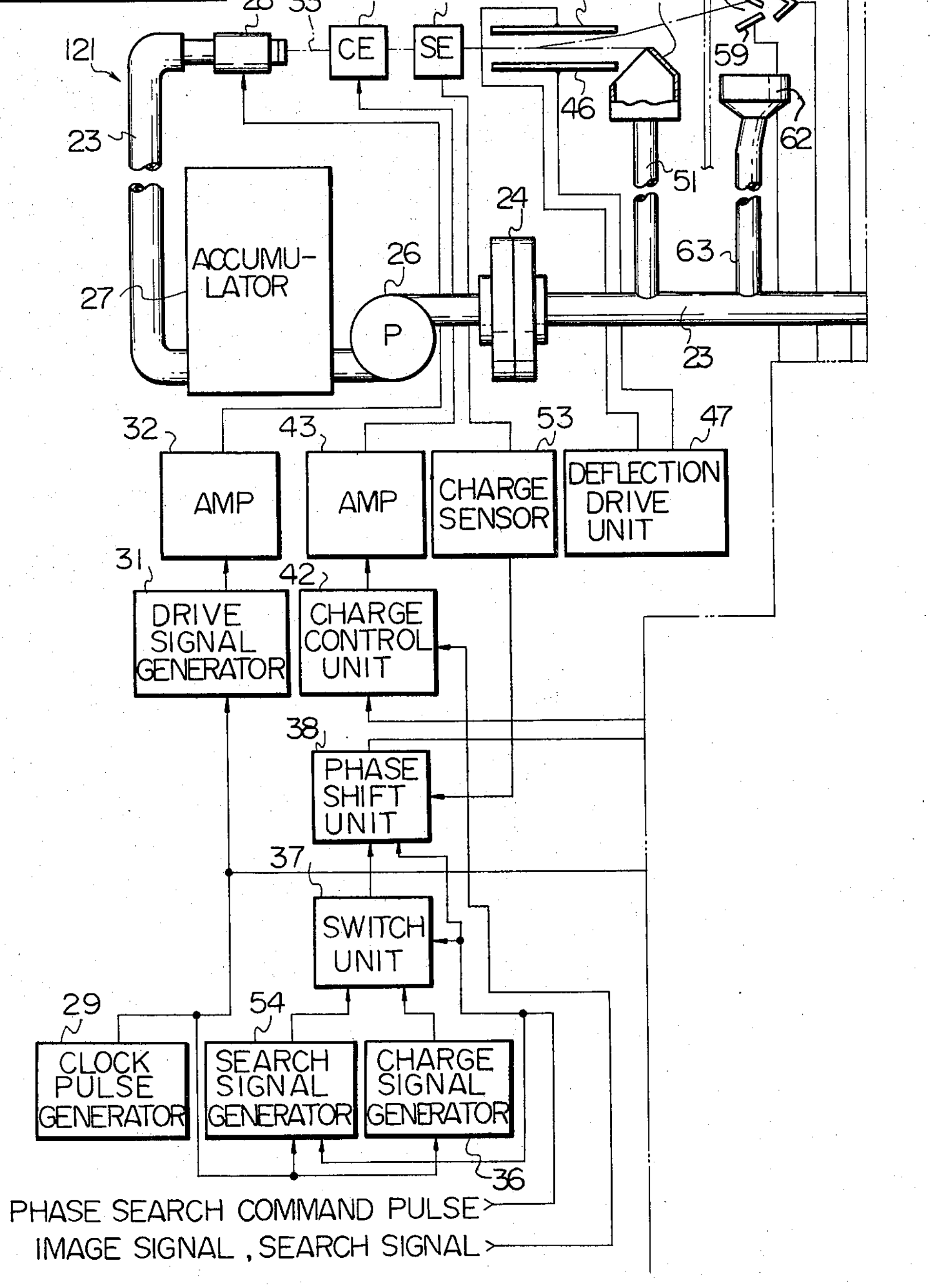
Figure 9B:
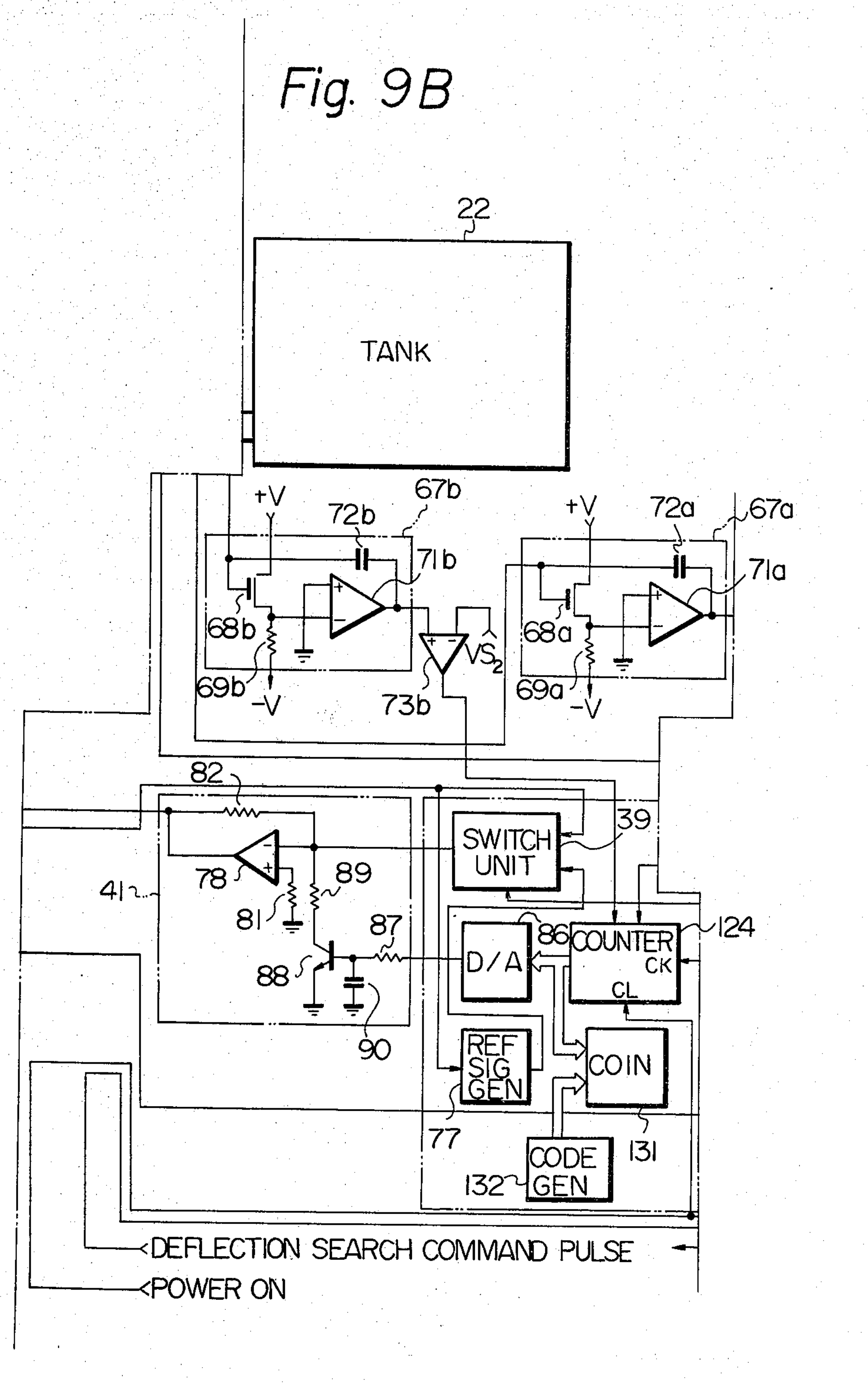
Figure 9C:
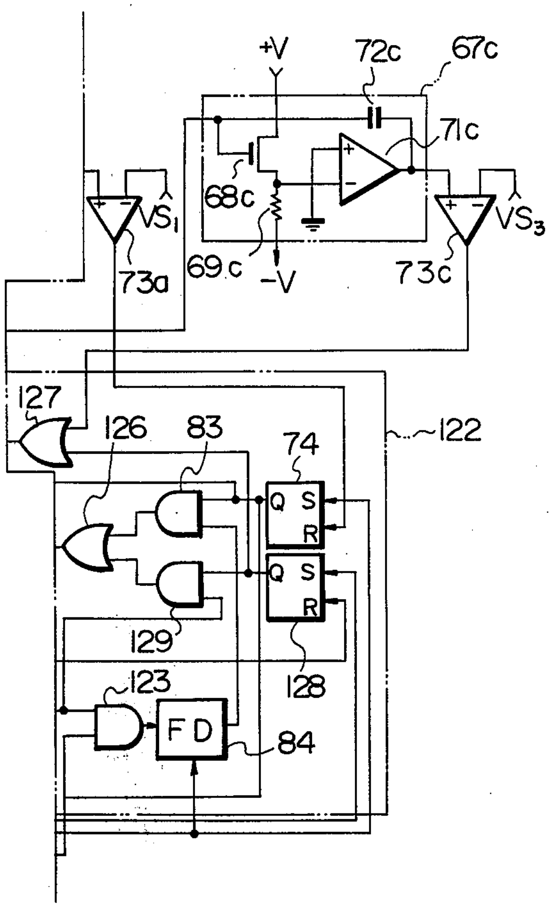

FIG. 9 illustrates an apparatus 121 which combines the circuitry of FIG. 1 with the three electrometers *67a*, *67b* and *67c* of FIG. 8 with a modified deflection sweep unit 122. The outputs of the clock pulse generator 29 and flip-flop 74 are connected to inputs of an AND gate 123, the output of which is connected to the input of the frequency divider 84. This enables the frequency divider 84 to receive frequency divided clock pulses only during the deflection search operation. The frequency divider 84 is also illustrated as being connected to be reset by the deflection search command pulse. The output of the AND gate 83 is connected to a clock input of an up-down counter 124 through an OR gate 126. A power ON signal is applied to the clear input of the counter 124. The output of the comparator 73*b* is connected to a down count control input of the counter 124. The output of the comparator 73*c* is connected through an OR gate 127 to an up count control input of the counter 124. The Q output of a flip-flop 128 is connected to an input of an AND gate 129, the output of which is connected to an input of the OR gate 126. Another input of the AND gate 129 is connected to the output of the clock pulse generator 29. The set input of the flip-flop 128 is connected to receive the power ON signal. The output of the counter 124 is connected to the converter 86 and also to an input of a coincidence unit 131. Another input of the unit 131 is connected to an output of a code generator unit 132. The output of the unit 131 is connected to the reset input of the flip-flop 128.

The code generator unit 132 comprises a plurality of switches and a diode-resistor matrix, although not shown in detail. Depending on the positions of the switches, the unit 132 produces a particulr binary output which constitutes an initial count for the counter 124. The coincidence unit 131 comprises a plurality of exclusive NOR gates in a number equal to the number of bits of the counter 124 and generator unit 132. The outputs of the exclusive NOR gates are connected to inputs of an AND gate. The inputs of the exclusive NOR gates are connected to the respective bit outputs of the code generator unit 132 and counter 124. Thus, the AND gate and thereby the unit 131 will produce a logically high output to reset the flip-flop 128 when the count in the counter 124 is equal to the output of the code generator unit 132.

The switches in the generator unit 132 are set so that the unit 132 produces an output corresponding to a count value in the counter 124 at which the ink jet should pass through the slit 61 and hit the target electrode 57. However, there is usually some deviation and the ink jet will hit the electrode 58 or 59.

The power ON signal sets the flip-flop 128 and clears the counter 124 to a count of zero. The high Q output of the flip-flop 128 enables the AND gate 129 so that the clock pulses from the generator 29 are gated to the clock input of the counter 124. The high Q output of the flip-flop 128 is also applied to the up count input of the counter 124 through the OR gate 127, causing the counter 124 to operate in the up count mode. The high frequency clock pulses from the AND gate 129 and OR gate 126 cause the counter 124 to count up fast. When the count in the counter 124 equals the code output of the generator 132, the coincidence unit 131 produces a high output which resets the flip-flop 128. The Q output of the flip-flop 128 goes low and inhibits the AND gate 129 so that no more clock pulses may be gated to the counter 124. Thus, the counter 124 stops counting at the count value equal to the code output of the generator 132.

The phase search operation is performed in response to the phase search command pulse. After the phase search operation is completed, the deflection command pulse is applied to the unit 122 which sets the flip-flop 74 to begin the deflection sweep or search operation in the manner described above. The frequency divided clock pulses from the frequency divider 84 are applied to the counter 124 through the AND gate 83 and OR gate 126.

If the ink jet hits the target electrode 57, the flip-flop 74 will be reset and the deflection sweep operation terminated as in the apparatus 21. If the ink jet hits the target 58, indicating that the deflection is too great, the comparator 73*b* will produce an output which will cause the counter 124 to be switched to down count operation. Thus, the clock pulses from the divider 84 will cause the counter 124 to count down and the output of the converter 86 to decrease in magnitude. This will decrease the magnitude of the charge applied to the ink jet and will decrease the deflection thereof. When the ink jet deflection is reduced to the extent that the ink jet hits the main target electrode 57, the comparator 73*a* will produce the main hit signal which will reset the flip-flop 74 and terminate the deflection search. Conversely, if the deflection is too small and the ink jet hits the target electrode 59, the comparator 73*c* will produce an output causing the counter 124 to operate in the up count mode. This will cause the ink jet deflection to progressively increase until the jet hits the electrode 57.

The apparatus 121 is advantageous in that the deflection search operation is extremely fast.

Figures 10, 10A, 10B, 10C:
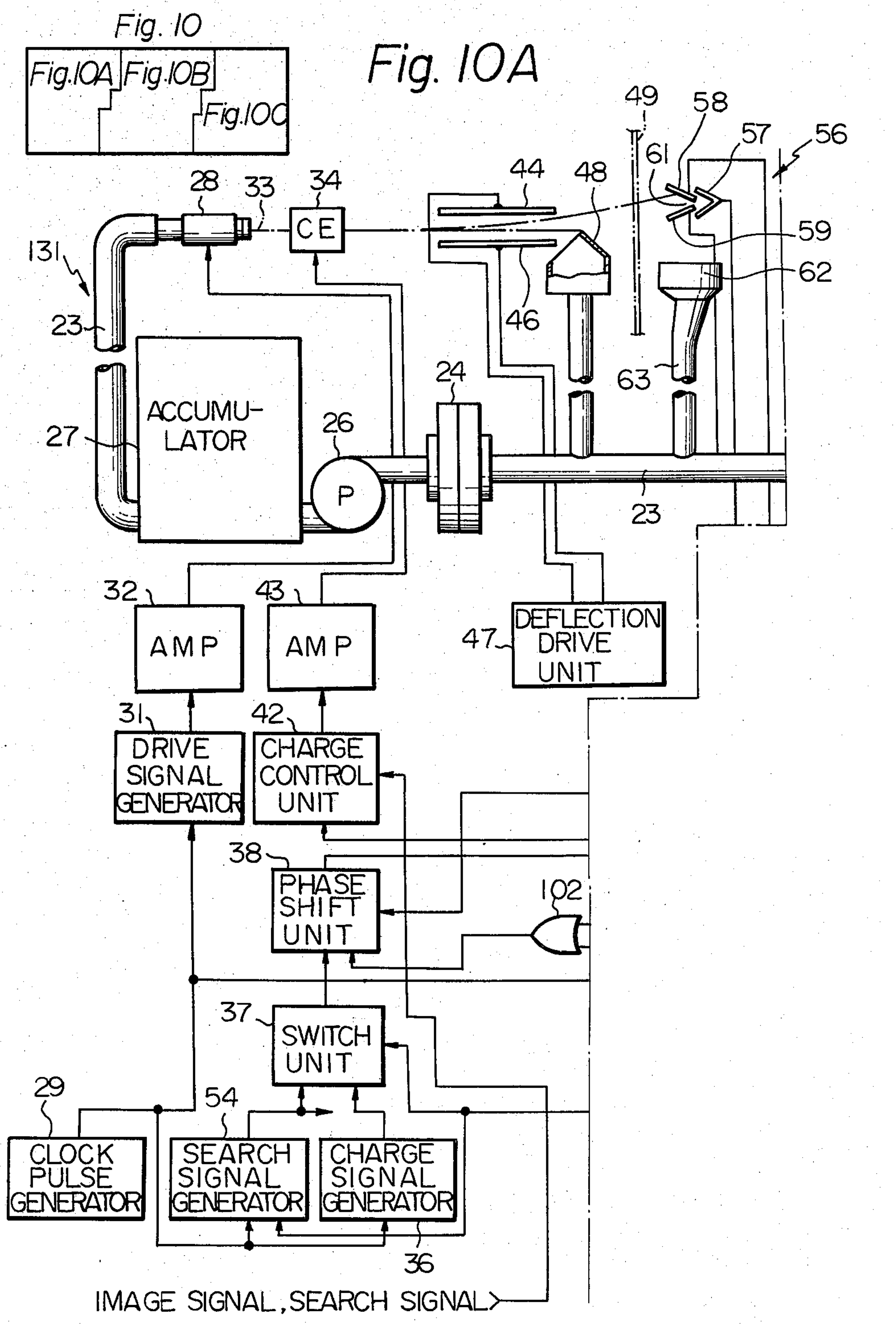
Figure 10B:
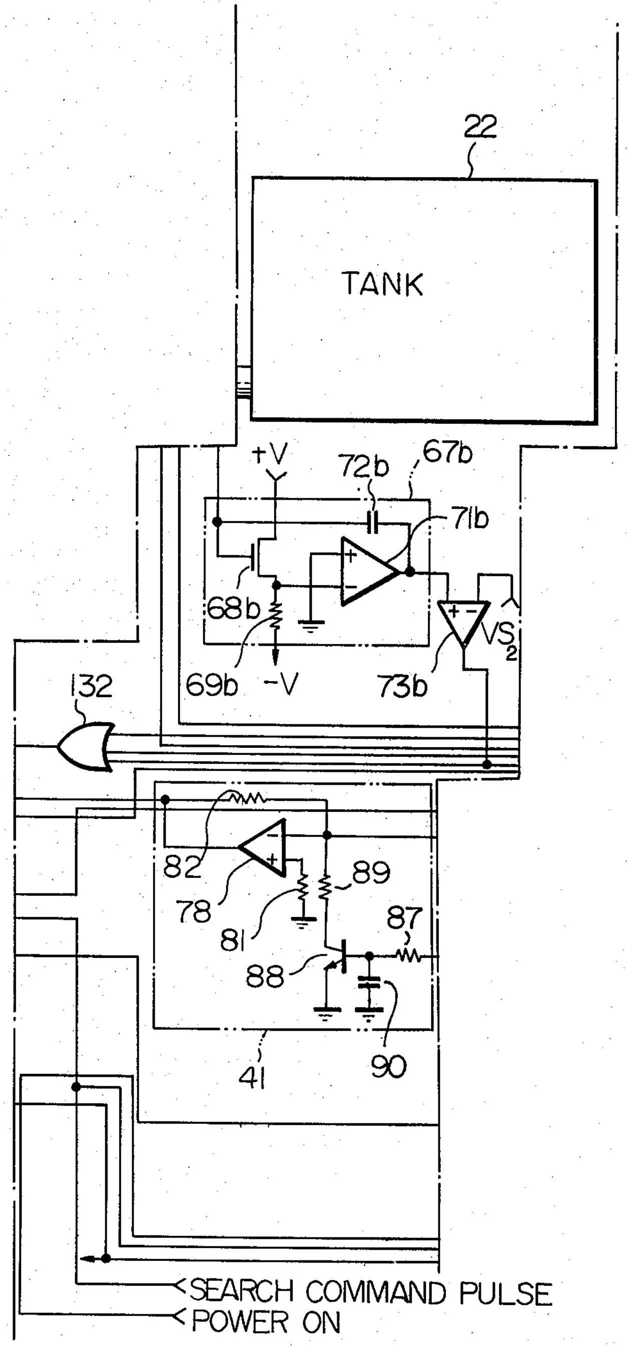
Figure 10C:
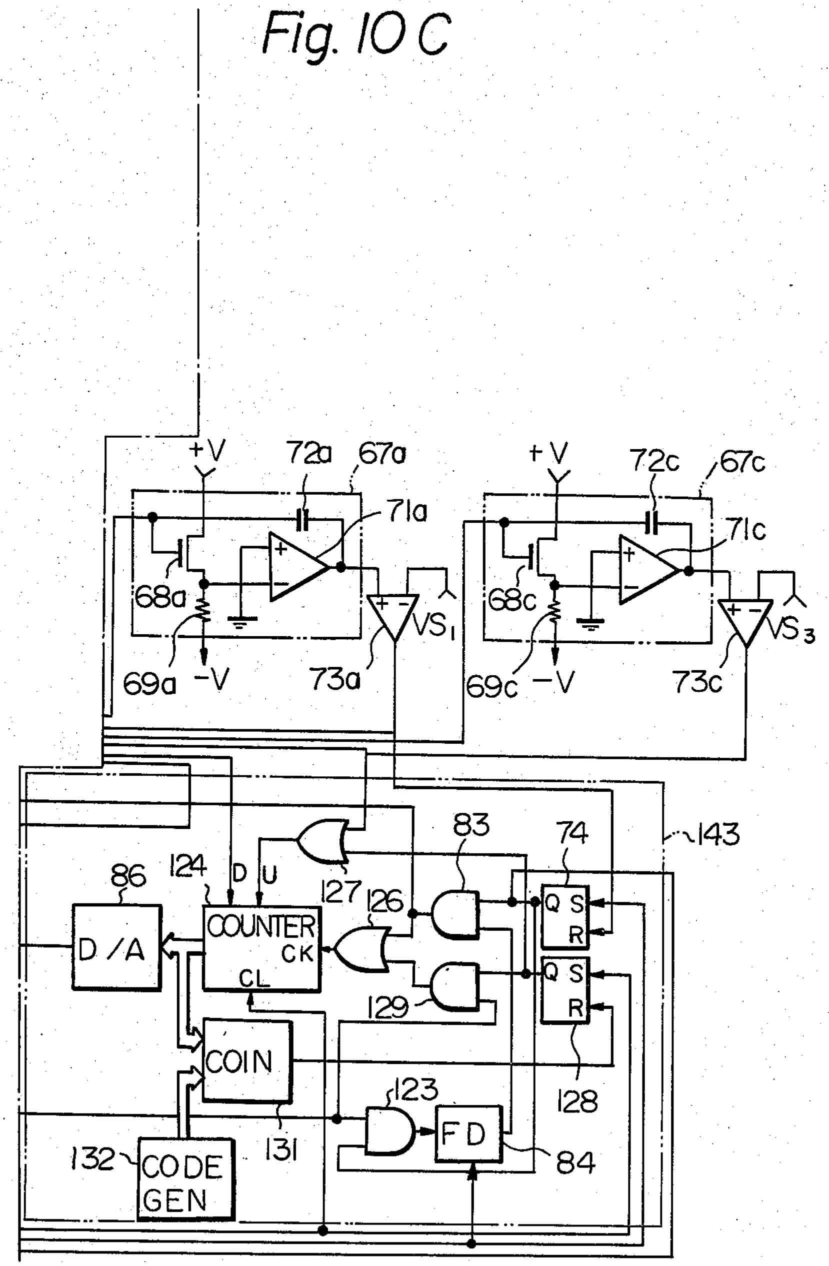

FIG. 10 illustrates an apparatus 131 which is similar to the apparatus 121 except that it has been modified to perform the phase and deflection search operations simultaneously in the manner of the apparatus 101. Whereas in the apparatus 101 the output of the comparator 73 is connected to the phase shift unit 38, in the apparatus 131 the outputs of the comparators 73*a*, 73*b* and 73*c* are connected to the phase shift unit 38 through an OR gate 132. The operation of the apparatus 131 is the same as the apparatus 101 except for the operation of a simplified deflection search unit 143.

Figures 11, 11A, 11B, 11C:
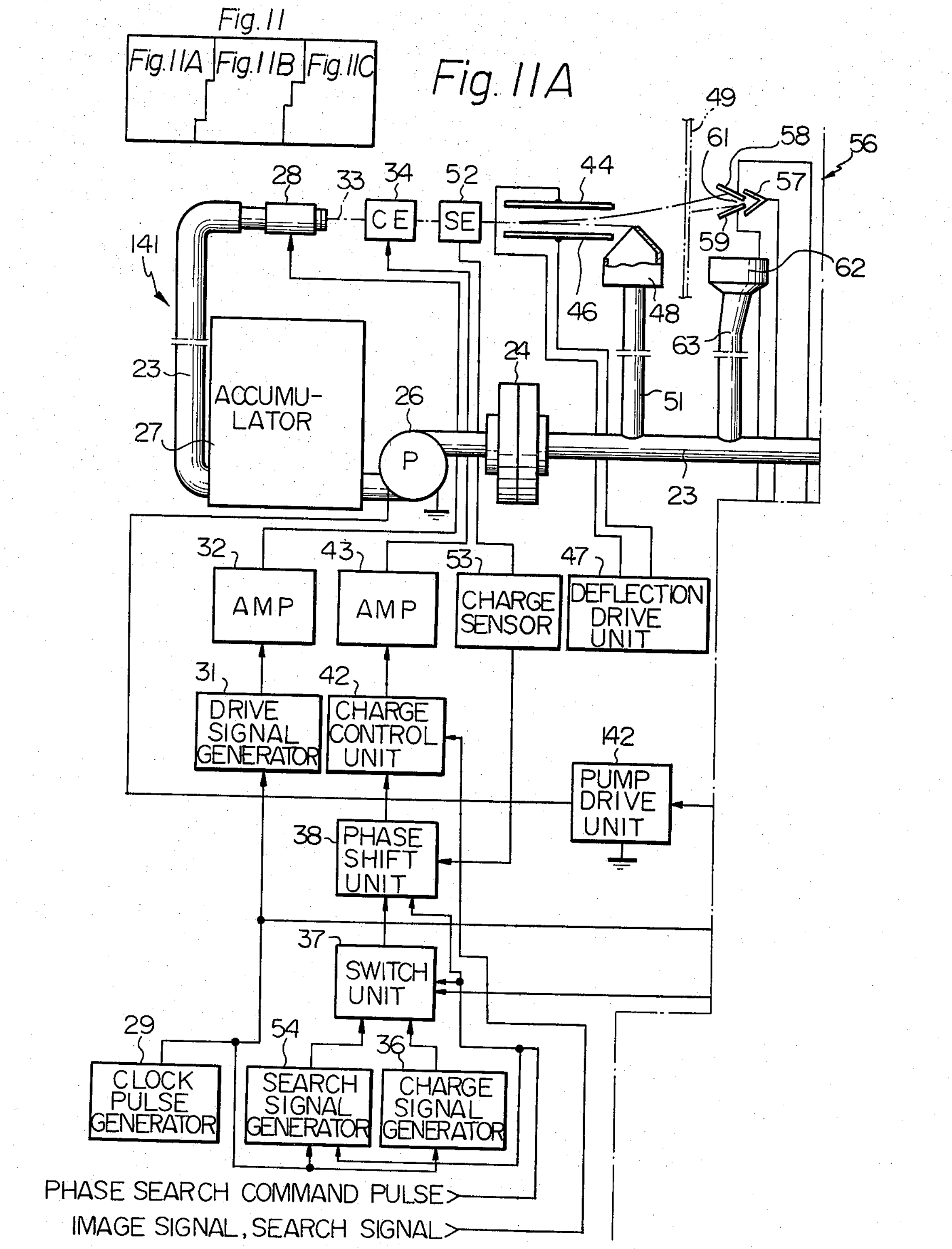
Figure 11B:
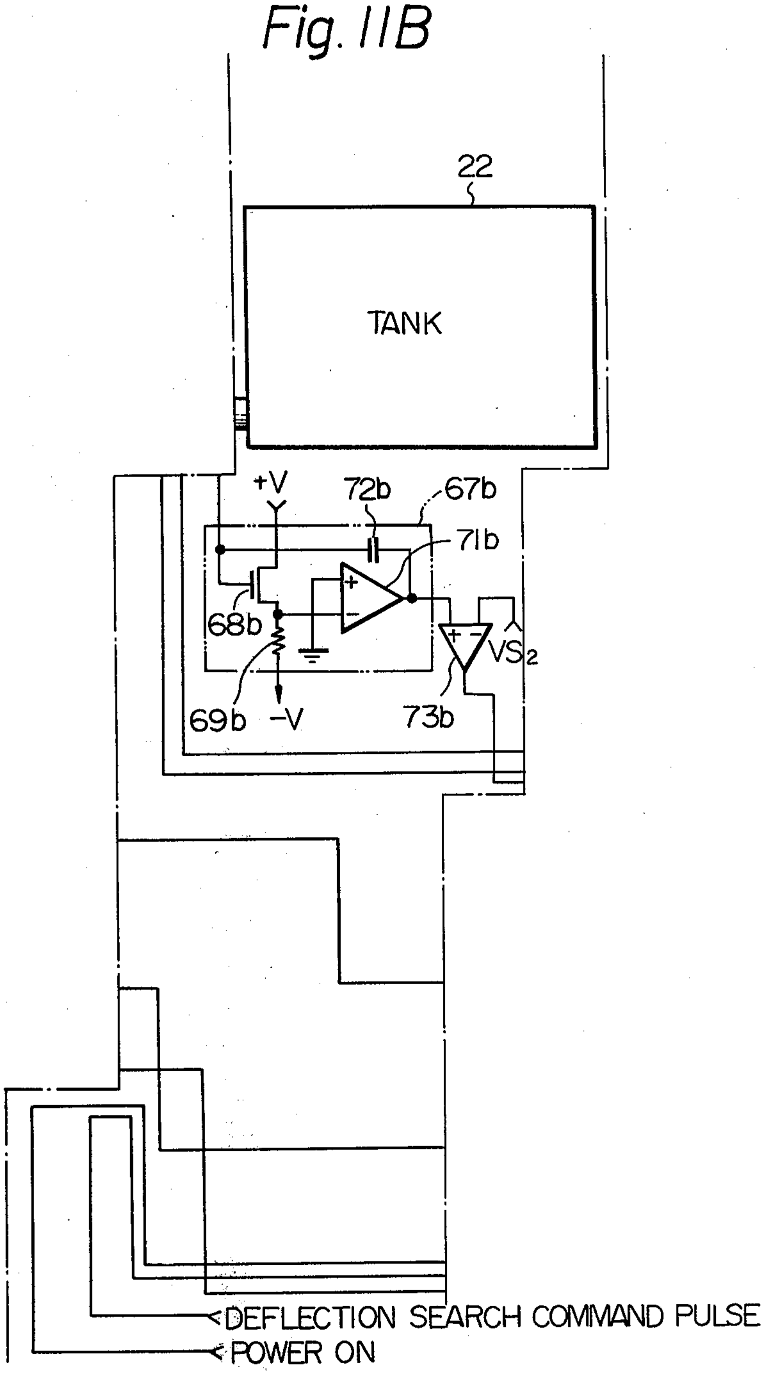
Figure 11C:
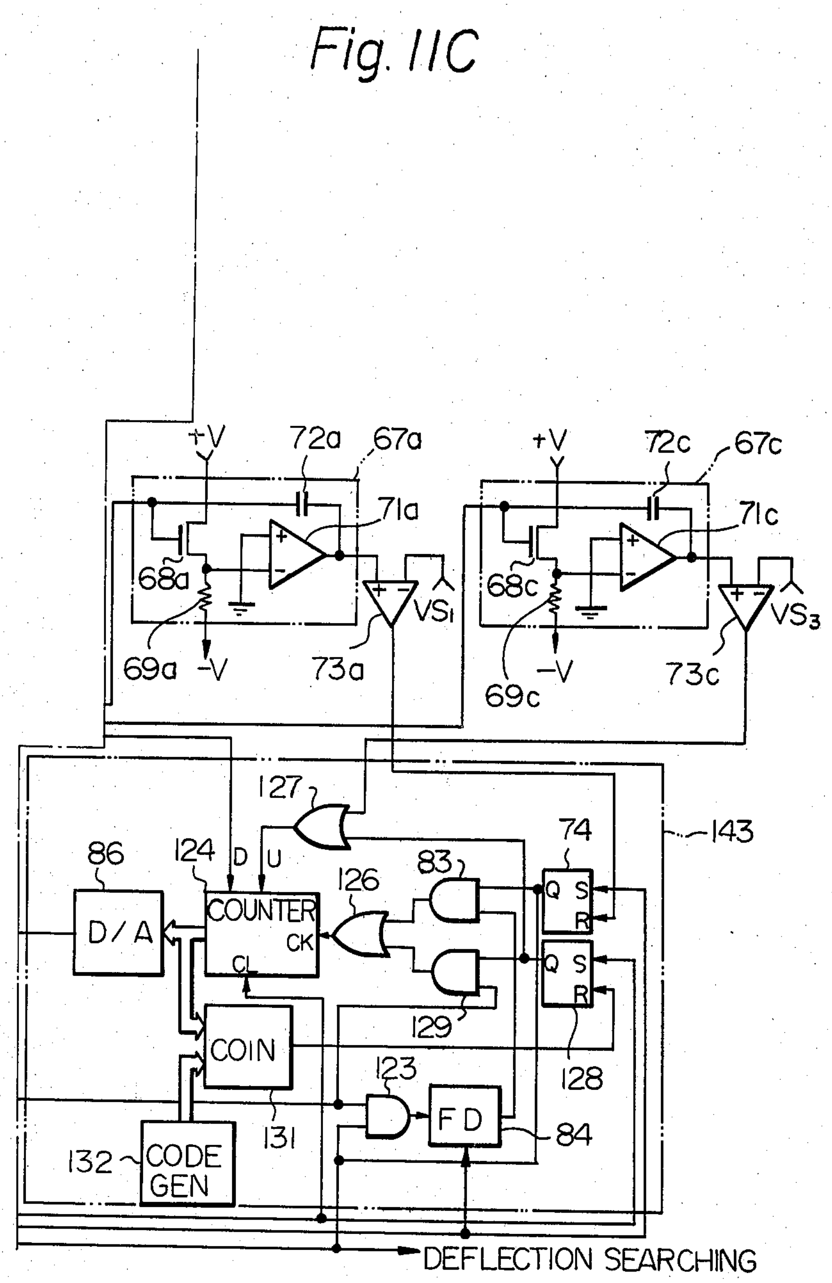

FIG. 11 illustrates an apparatus 141 which is similar to the apparatus 121 except that the output of the converter 86 is connected to control the output pressure of the pump 26 rather than the magnitude of the charging pulses. The reference signal generator 77 and the switch unit 39 are not necessary. The output of the converter 86 is connected to a pump drive unit 142 which drives the pump 26. The unit 142 may vary the drive voltage, current, duty cycle or any other parameter which functions to vary the output pressure of the pump 26. As will be understood from examination of equation (1), the greater the velocity of the ink drops, the smaller the deflection thereof if all other variables are held constant. The velocity of the ink drops increases as the output pressure of the pump 26 is increased. The unit 142 is constructed to decrease the output pressure of the pump 26 as the output voltage of the converter 86 increases. The pump 26 may be of any type such as rotary or reciprocating.

Figure 12:
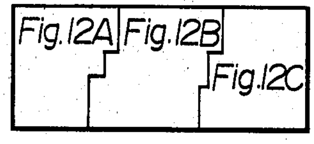
Figure 12A:
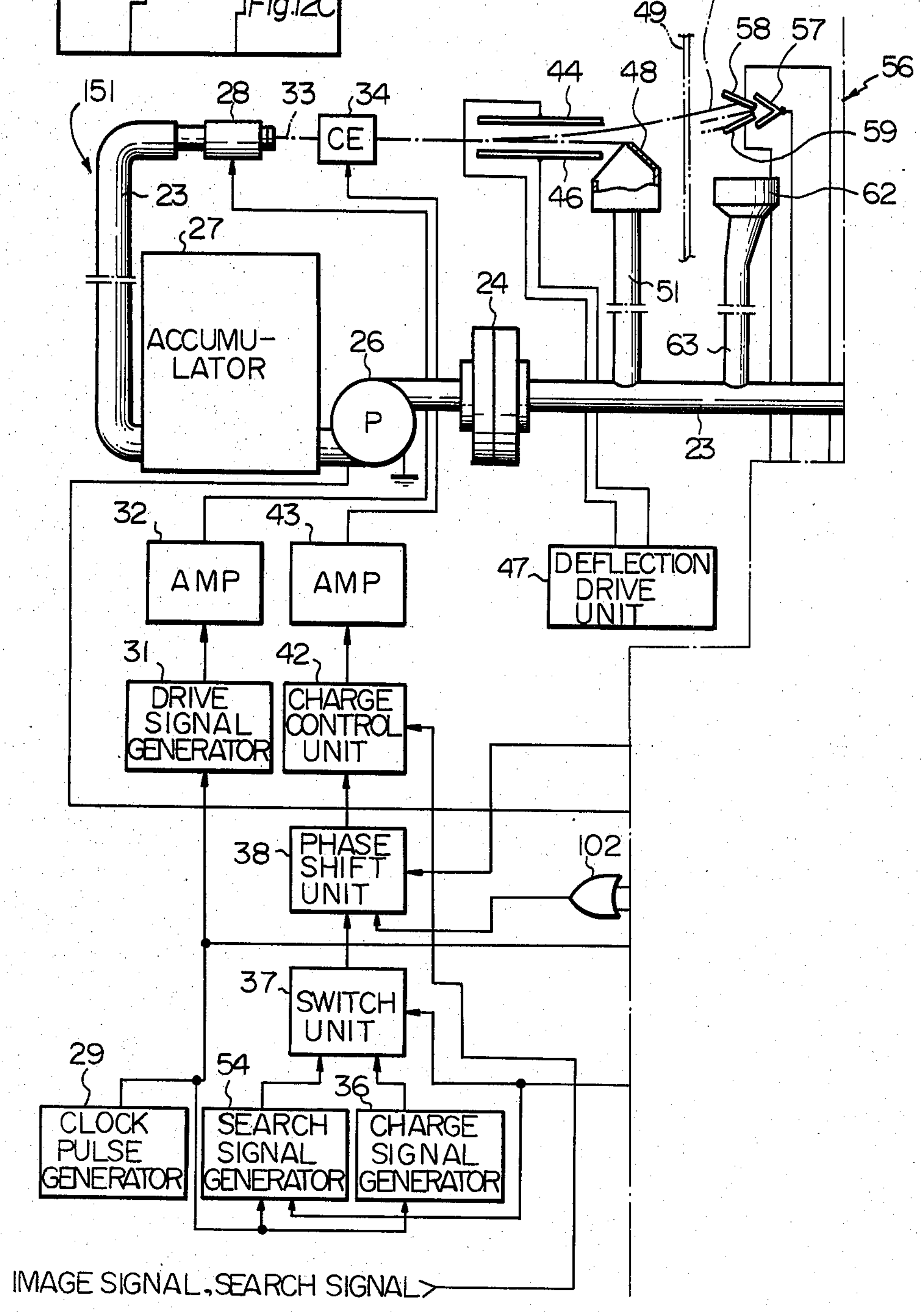
Figure 12B:
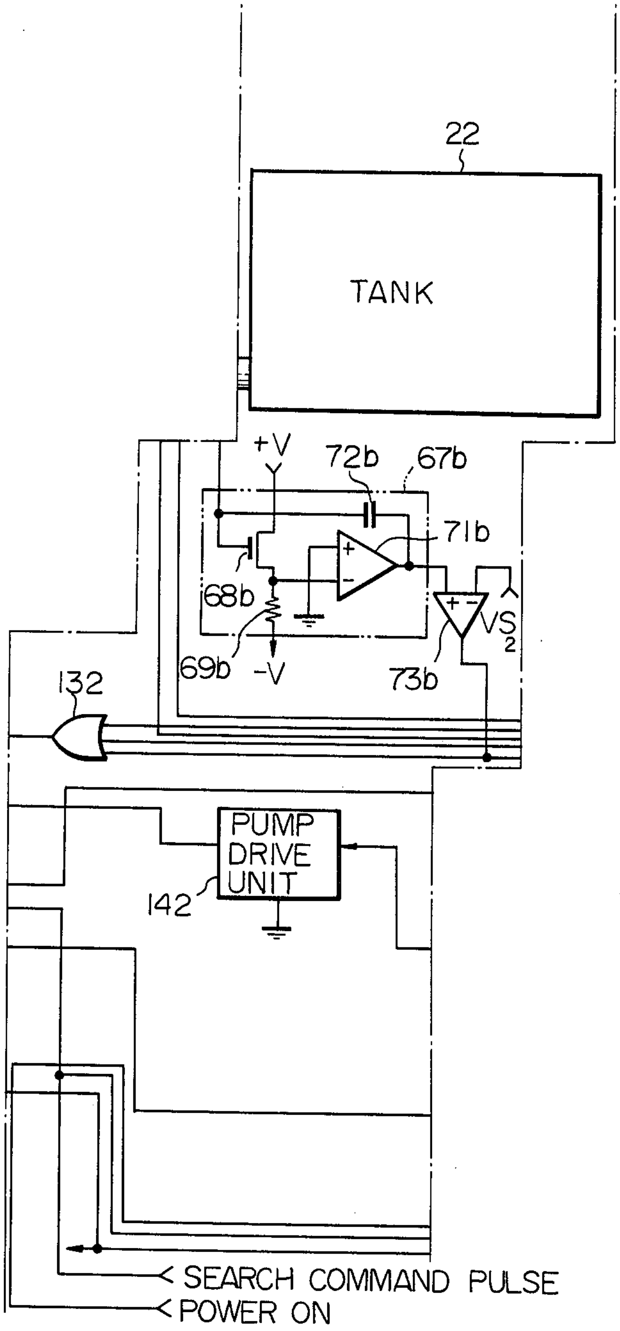
Figure 12C:
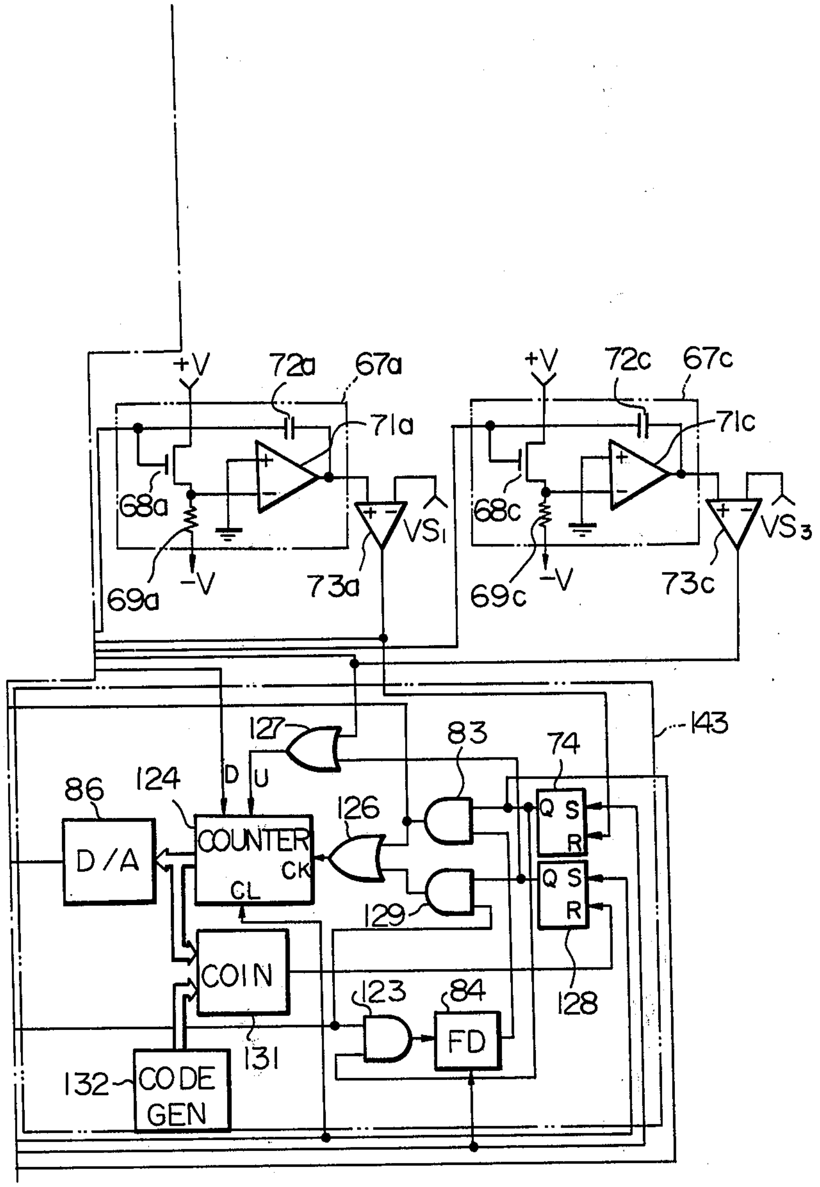

FIG. 12 illustrates another apparatus 151 which is similar to the apparatus 141 except that it is adapted to perform phase search and deflection search simultaneously in the manner of the apparatus 101.

Figure 13B:
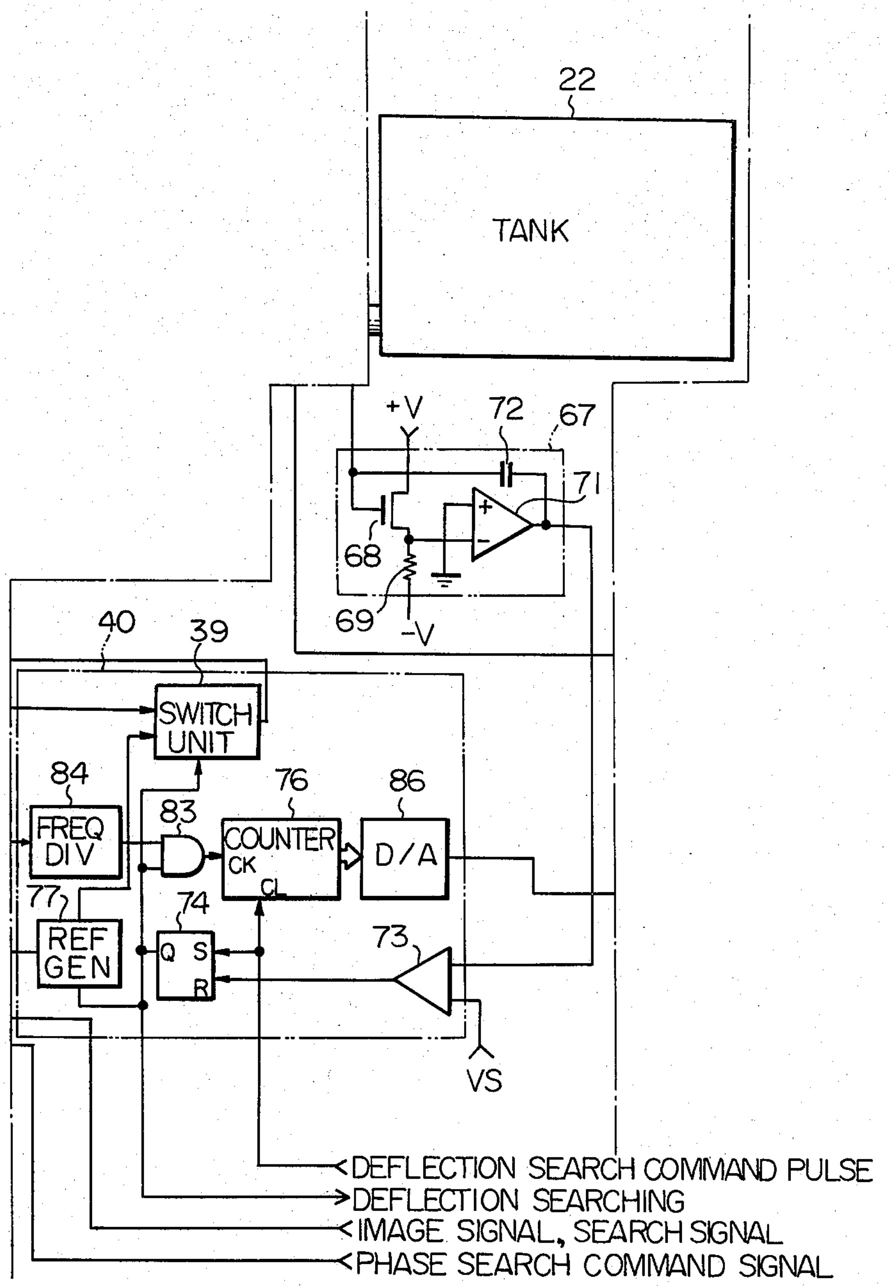
Figure 13C:
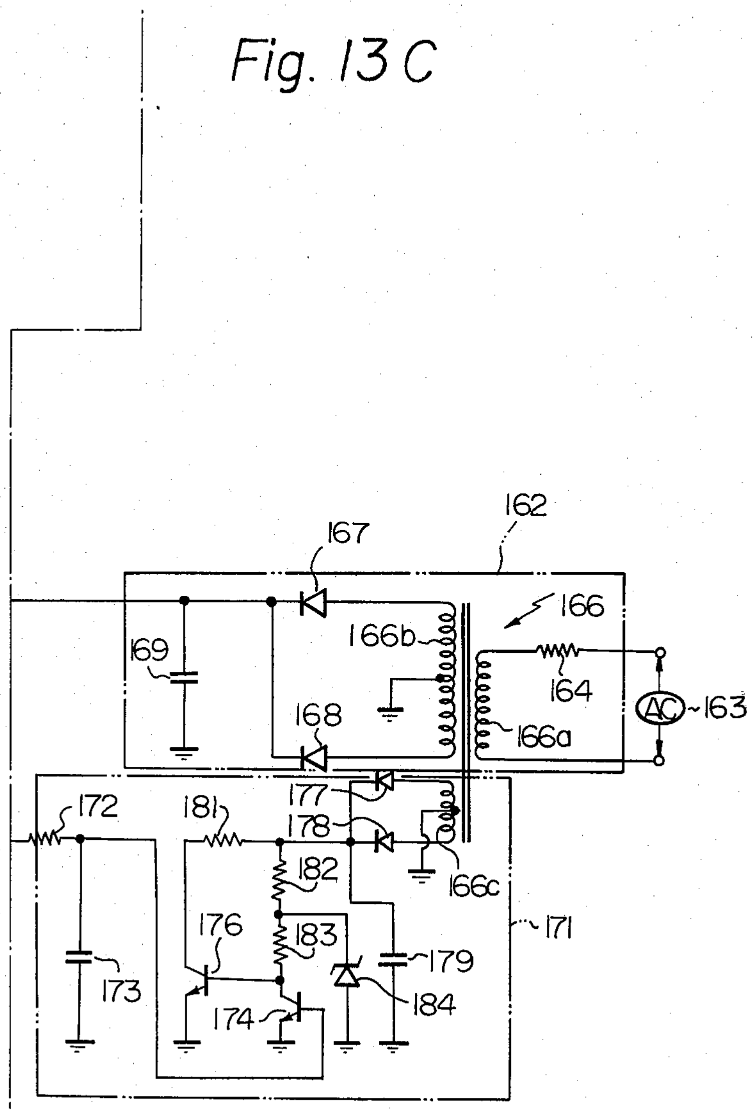

FIG. 13 illustrates an apparatus 161 which is similar to the apparatus 21 except that the deflection is adjusted by means of varying the voltage applied to the electrodes 44 and 46 rather than the electrode 34. The apparatus 161 comprises a power supply 162 comprising an A.C. power source 163 which is connected in series with a resistor 164 across a primary winding 166*a* of a power transformer 166. A center tap of a secondary winding 166*b* of the transformer 166 is grounded and the ends of the winding 166*b* are connected to anodes of diodes 167 and 168 which constitute a full wave rectifier. The cathodes of the diodes 167 and 168 are connected to ground through a capacitor 169 which constitutes a ripple filter and to the electrode 46. The electrode 44 is grounded.

The output of the converter 86 is connected through a resistor 172 and capacitor 173 of a level set unit 171 to ground. The junction of the resistor 172 and capacitor 173 is also connected to the base of an NPN transistor 174, the emitter of which is grounded. The collector of the transistor 174 is connected to the base of an NPN transistor 176, the emitter of which is grounded.

The transformer 166 has another secondary winding 166*c*, a center tap of which is grounded. The ends of the winding 166*c* are connected to the anodes of diodes 177 and 178, the cathodes of which are connected to ground through a capacitor 179. The cathodes of the diodes 177 and 178 are connected to the collector of the transistor 176 through a resistor 181 and to the collector of the transistor 174 through resistors 182 and 183. The junction of the resistors 182 and 183 is connected to the cathode of a zener diode 184, the anode of which is grounded.

As the output of the converter 86 increases, the base voltage of the transistor 174 increases. Although the voltage at the junction of the resistors 182 and 183 is maintained constant by the zener diode 184, the collector current of the transistor 174 increases as the base voltage increases and the collector voltage of the transistor 174 decreases. This reduces the current flow through the transistor 176 and resistor 181 and thereby the current flow through the secondary winding 166*c* and diodes 177 and 178. Thus, a smaller amount of current is consumed by the secondary winding 166*c*, and the voltage across the capacitor 169 and thereby the voltage applied to the electrode 46 increases. This increases the deflection of the ink jet. In summary, the ink jet deflection increases as the output of the converter 86 increases.

Conversely, as the output of the converter 86 decreases, the current flow through the transistor 174 decreases and the current flow through the transistor 176 increases. This increases the current flow through the secondary winding 166*c*. Due to the current limiting effect of the resistor 164, increased current flow through the winding 166*c* will bleed the winding 166*b* so that the voltage across the winding 166*b* and thereby across the capacitor 169 decreases. This has the effect of decreasing the voltage applied to the electrode 46 and the deflection of the ink jet. In summary, the ink jet deflection decreases as the output of the converter 86 decreases.

Figure 14:
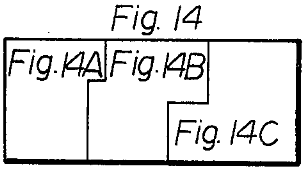
Figure 14A:
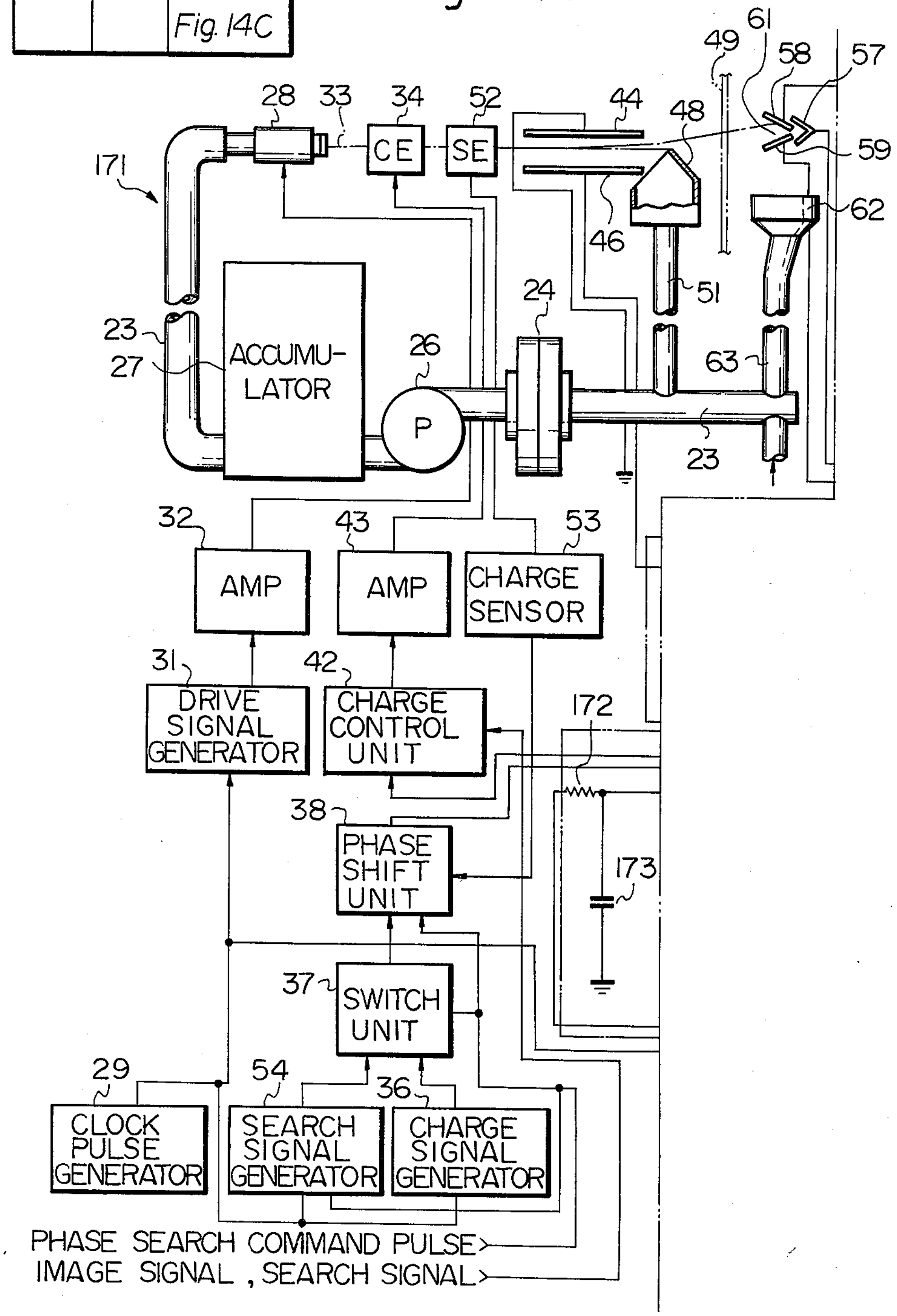
Figure 14B:
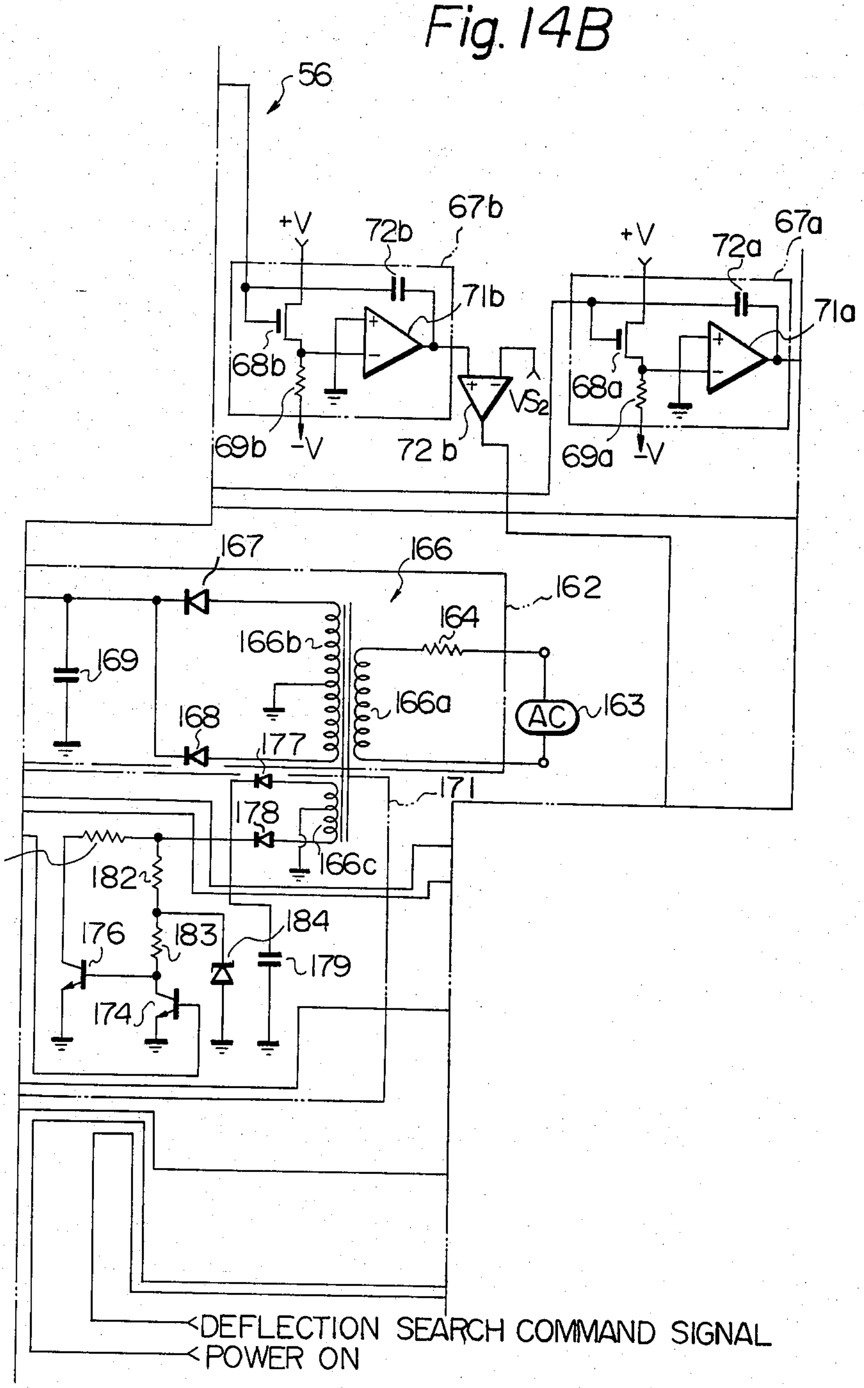
Figure 14C:
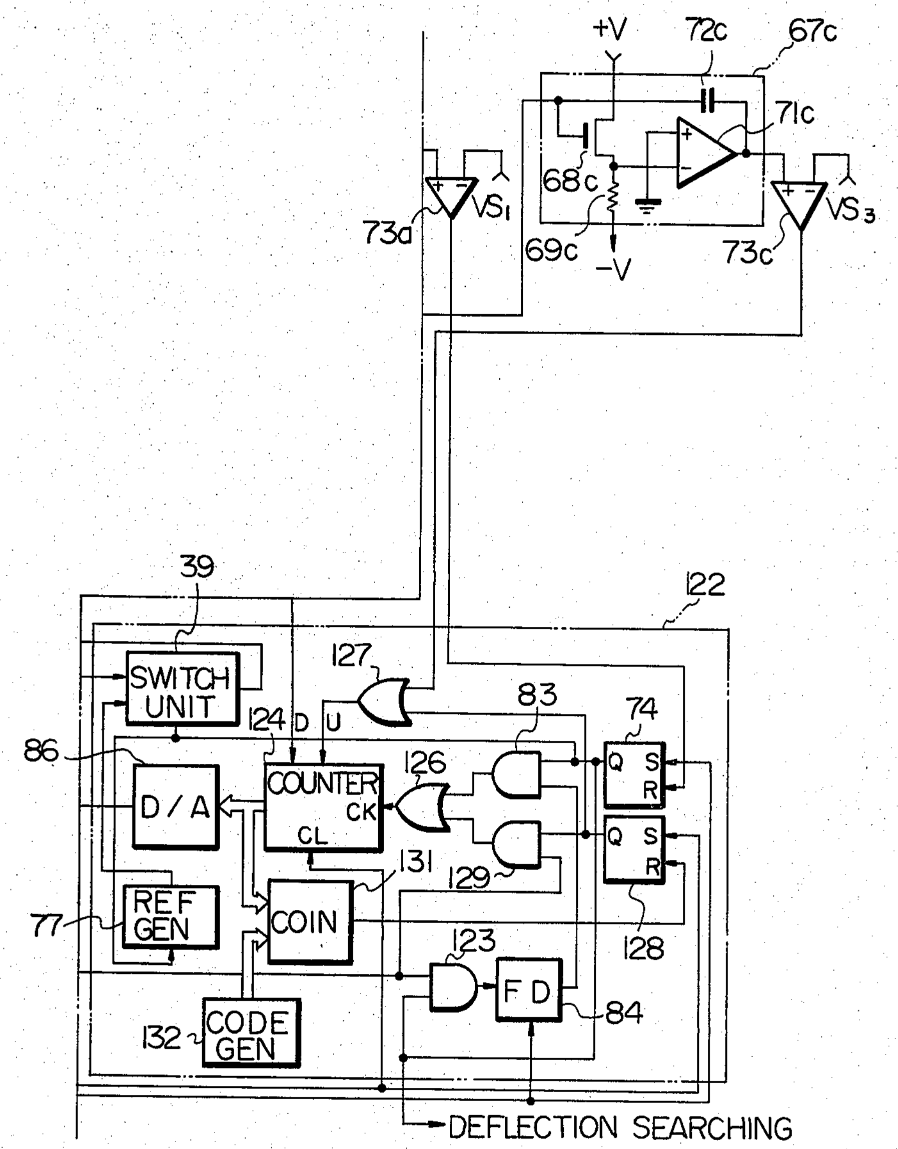

An apparatus 171 illustrated in FIG. 14 is similar to the apparatus 121 shown in FIG. 9 except that the output of the converter 86 is connected to the level set unit 171 of FIG. 13 to vary the deflection voltage applied to the electrode 46 in the manner described with reference to FIG. 13.

Figures 15, 15A, 15B:
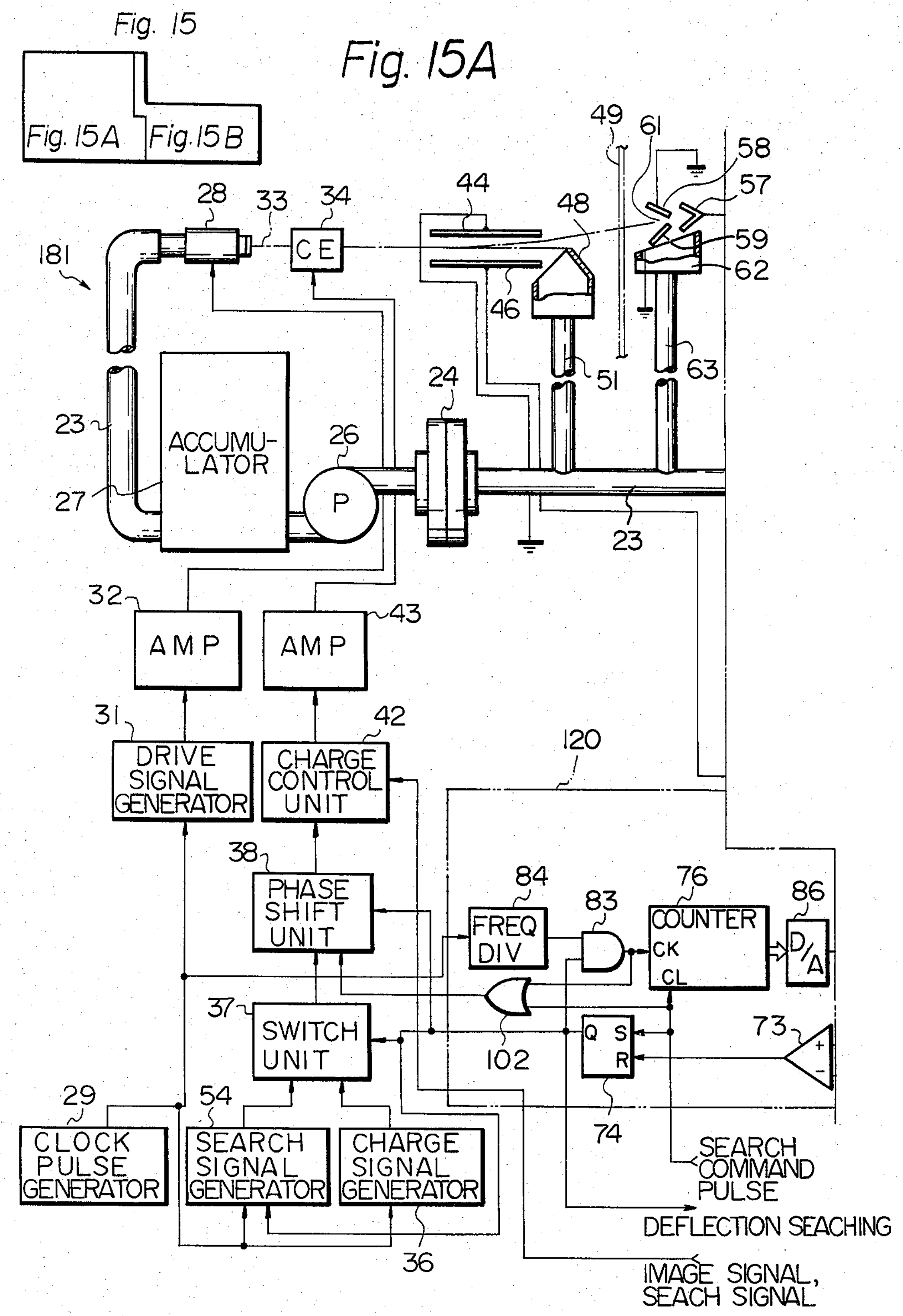
Figure 15B:
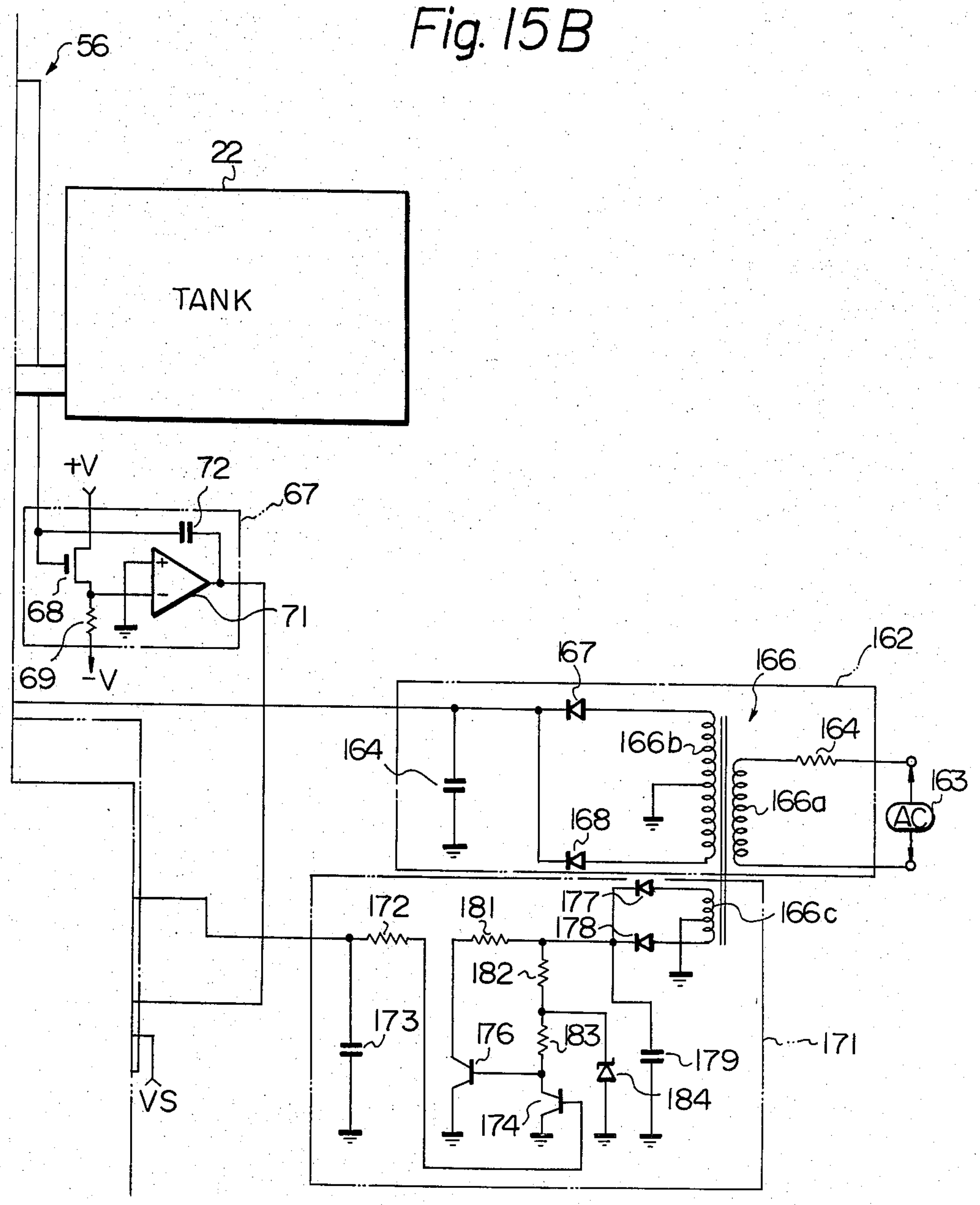

FIG. 15 illustrates an apparatus 181 which corresponds to the apparatus 101 of FIG. 7 except that the output of the converter 86 is connected to the level set unit 171 to control the deflection voltage. In the apparatus 181, phase and deflection searching are performed simultaneously as described hereinabove.

Figure 16B:
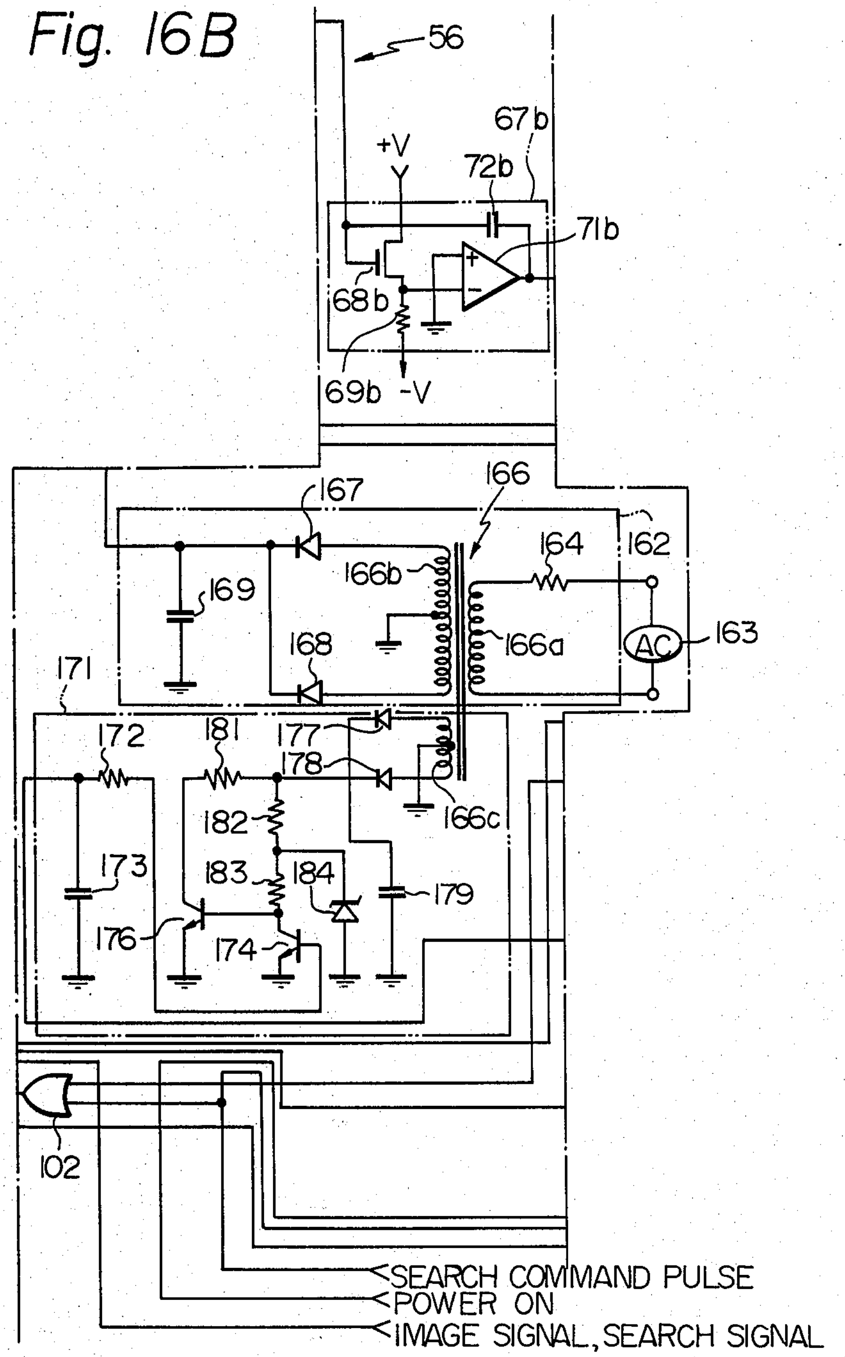
Figure 16C:
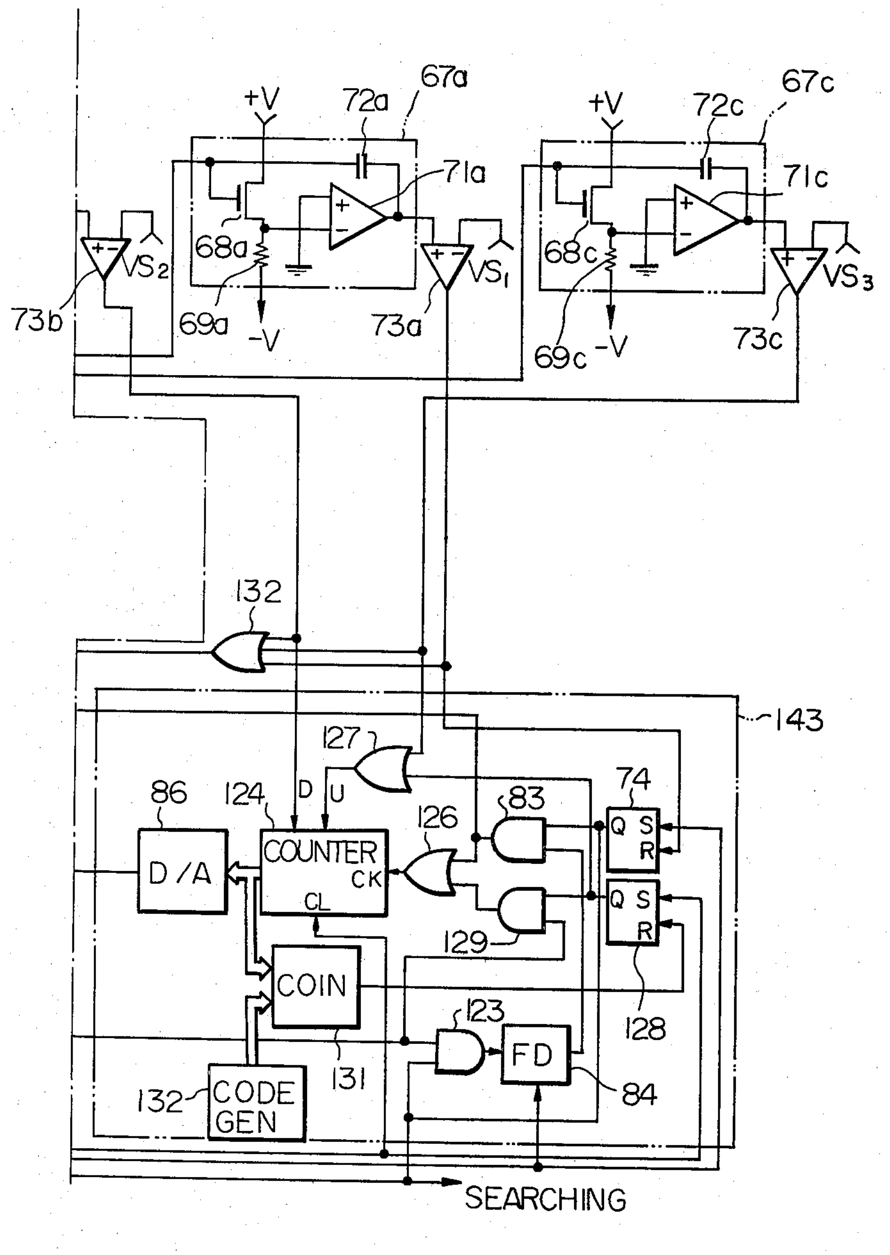

FIG. 16 illustrates another apparatus 191 which is similar to the apparatus 131 of FIG. 10 except that the output of the converter 86 is connected to the level set unit 171 to control the deflection voltage. In the apparatus 191, phase and deflection searching are performed simultaneously.

In summary, it will be seen that the present invention provides an ink ejection printing apparatus which enables optimal deflection adjustment in an automatic manner and also enables deflection and phase adjustment to be performed simultaneously using a unitary circuit. Various modifications will become possible for those skilled in the art after receiving the teachings of the present disclosure without departing from the scope thereof. For example, the target unit 56 may be replaced with photosensors, piezoelectric sensors or the like to sense impingement of the ink jet on a target. The counters and voltage polarities may be adapted to be opposite to that described as long as the desired results are obtained. Although the present apparatus has been described and illustrated as being provided with an ink ejection head comprising a single nozzle, the present invention is equally applicable to a multi-jet head apparatus. The head and electrode assembly may be moved relative to the paper rather than vice-versa. As yet another modification, the phase of the ejection pulses may be shifted while the phase of the charging pulses is maintained constant.

What is claimed is:

1. An ink ejection apparatus including ink ejection means for ejecting and charging ink and deflecting the ink from an ejection axis in a direction in response to a deflection signal, characterized by comprising:

target means spaced from the ejection axis in said direction;

hit sensor means for sensing impingement of the ink on the target means and producing a hit signal in response thereto; and deflection sweep means for controlling the ink ejection means to sweepingly vary deflection of the ink until the hit sensor means produces the hit signal;

the ink ejection means comprising nozzle means for ejecting ink in response to ejection pulses, charging means for charging the ink in response to charging pulses, charge sensor means for sensing when the ink has a predetermined charge and producing a phase set signal in response thereto and phase sweep means for sweepingly varying a phase between the ejection pulses and the charging pulses until the charge sensor means produces the phase set signal, the deflection sweep means and the phase sweep means being independent of each other.

2. An apparatus as in claim 1, in which the ink ejection means comprises a pump, the deflection means being constructed to vary an output pressure of the pump.

3. An apparatus as in claim 1, in which the ink ejection means comprises a charging electrode for charging the ink, the deflection sweep means being constructed to vary a charging voltage applied to the charging electrode.

4. An apparatus as in claim 1, in which the ink ejection means comprises a deflection electrode for deflecting the charged ink when the deflection signal is applied thereto, the deflection sweep means being constructed to vary a magnitude of the deflection signal.

5. An apparatus as in claim 1, in which the target means comprises first and second plates defining a slit therebetween and a target disposed behind the slit such that the ink must pass through the slit to reach the target, the sensor means producing the hit signal in response to impingement of the ink on the target.

6. An apparatus as in claim 1, in which the ink ejection means comprises nozzle means for ejecting ink in response to ejection pulses, charging means for charging the ink in response to charging pulses, charge sensor means for sensing when the ink has a predetermined charge and producing a phase set signal in response thereto and phase sweep means for sweepingly varying a phase between the ejection pulses and the charging pulses until the charge sensor means produces the phase set signal.

7. An apparatus as in claim 1, in which the deflection sweep means is constructed to control the ink ejection means to begin variation of the deflection of the ink after the charge sensor means produces the phase set signal.

8. An apparatus as in claim 1, in which the charge sensor means is constituted by the hit sensor means, the phase set signal being constituted by the hit signal, the phase sweep means sweepingly varying the phase between the ejection pulses and the charging pulses in simultaneity with the deflection sweep means controlling the ink ejection means to sweepingly vary the deflection of the ink.

9. An apparatus as in claim 1, in which the target means comprises an electrode, the hit sensor means comprising electrometer means.

10. An apparatus as in claim 9, in which the electrometer means comprises an integrating circuit.

11. An apparatus as in claim 1, in which the target means comprises a main target, the hit sensor means producing the hit signal in response to impingement of the ink on the main target, a first auxiliary target spaced from the main target in said direction and a second auxiliary target spaced from the main target opposite to said direction, the hit sensor means being further constructed to produce a first auxiliary hit signal in response to impingement of the ink on the first auxiliary target and a second auxiliary hit signal in response to impingement of the ink on the second auxiliary target, the deflection sweep means causing the ink ejection means to sweep the ink opposite to said direction in response to the first auxiliary hit signal and to sweep the ink in said direction in response to the second auxiliary hit signal.

12. An apparatus as in claim 11, in which the first and second auxiliary targets comprise plates defining a slit therebetween, the main target being disposed behind the slit such that the ink must pass through the slit to reach the main target.

13. An apparatus as in claim 1, in which the deflection sweep means comprises a counter, count sweep means for sweepingly varying a count in the counter and analog-to-digital converter means for producing a deflection sweep signal corresponding to the count in the counter, the ink ejection means deflecting the ink by an amount corresponding to the deflection sweep signal.

14. An apparatus as in claim 13, in which the count sweep means comprises reset means for initially resetting the counter and pulse generator means for applying pulses to the counter causing the counter to increment.

15. An apparatus as in claim 13, in which the target means comprises a main target, the hit sensor means producing the hit signal in response to impingement of the ink on the main target, a first auxiliary target spaced from the main target in said direction and a second auxiliary target spaced from the main target opposite to said direction, the hit sensor means being further constructed to produce a first auxiliary hit signal in response to impingement of the ink on the first auxiliary target and a second auxiliary hit signal in response to impingement of the ink on the second auxiliary target, the counter being an up-down counter, the count sweep means comprising pulse generator means for applying pulses to a count input of the counter and control means for causing the counter to count up in response to the second auxiliary hit signal and to count down in response to the first auxiliary hit signal.

16. An apparatus as in claim 15, in which the count sweep means further comprises initialization means for setting an initial count into the counter.

17. An ink ejection apparatus including ink ejection means for ejecting and charging ink and deflecting the ink from an ejection axis in a direction in response to a deflection signal, characterized by comprising:

target means spaced from the ejection axis in said direction;

hit sensor means for sensing impingement of the ink on the target means and producing a hit signal in response thereto; and deflection sweep means for controlling the ink ejection means to sweepingly vary deflection of the ink until the hit sensor means produces the hit signal;

the target means comprising a main target, the hit sensor means producing the hit signal in response to impingement of the ink on the main target, a first auxiliary target spaced from the main target in said direction and a second auxiliary target spaced from the main target opposite to said direction, the hit sensor means being further constructed to produce a first auxiliary hit signal in response to impingement of the ink on the first auxiliary target and a second auxiliary hit signal in response to impingement of the ink on the second auxiliary target, the deflection sweep means causing the ink ejection means to sweep the ink opposite to said direction in response to the first auxiliary hit signal and to sweep the ink in said direction in response to the second auxiliary hit signal;

the first and second auxiliary targets comprising plates defining a slit therebetween, the main target being disposed behind the slit such that the ink must pass through the slit to reach the main target.

18. An ink ejection apparatus including ink ejection means for ejecting and charging ink and deflecting the ink from an ejection axis in a direction in response to a deflection signal, characterized by comprising:

target means spaced from the ejection axis in said direction;

hit sensor means for sensing impingement of the ink on the target means and producing a hit signal in response thereto; and deflection sweep means for controlling the ink ejection means to sweepingly vary deflection of the ink until the hit sensor means produces the hit signal;

the target means comprising first and second plates defining a slit therebetween and a target disposed behind the slit such that the ink must pass through the slit to reach the target, the sensor means producing the hit signal in response to impingement of the ink on the target.

* * * * *